United States Patent
Ramesh et al.

(10) Patent No.: US 12,160,108 B2
(45) Date of Patent: *Dec. 3, 2024

(54) SYSTEMS AND METHODS FOR FLEXIBLE RENEWABLE ENERGY POWER GENERATION

(71) Applicant: 8ME NOVA, LLC, El Dorado Hills, CA (US)

(72) Inventors: Gautham Ramesh, San Francisco, CA (US); Lukas Mercer Hansen, El Dorado Hills, CA (US); Michael Healy, Santa Monica, CA (US); Thomas Buttgenbach, Los Angeles, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,602

(22) Filed: Mar. 28, 2024

(65) Prior Publication Data
US 2024/0243580 A1    Jul. 18, 2024

Related U.S. Application Data

(63) Continuation of application No. 17/330,252, filed on May 25, 2021, now Pat. No. 11,949,237, which is a continuation of application No. 17/328,760, filed on May 24, 2021, now Pat. No. 11,171,485.

(51) Int. Cl.
*H02J 3/32* (2006.01)
*H02J 3/38* (2006.01)
*H02J 7/00* (2006.01)
*H02S 10/12* (2014.01)

(52) U.S. Cl.
CPC ............ *H02J 3/32* (2013.01); *H02J 3/381* (2013.01); *H02J 7/0068* (2013.01); *H02S 10/12* (2014.12); *H02J 2300/24* (2020.01); *H02J 2300/26* (2020.01); *H02J 2300/28* (2020.01)

(58) Field of Classification Search
CPC .......... H02J 3/381–386; H02J 2300/20; H02J 2300/22; H02J 2300/24; H02J 2300/26; H02J 2300/28; H02S 10/12
See application file for complete search history.

(56) References Cited

U.S. PATENT DOCUMENTS

| | | |
|---|---|---|
| 11,031,781 B1 | 6/2021 | Zanone et al. |
| 11,949,237 B2 * | 4/2024 | Ramesh ................ H02J 3/381 |
| 2011/0276269 A1 * | 11/2011 | Hummel ................ G01W 1/10 |
| | | 702/3 |
| 2012/0249065 A1 | 10/2012 | Bissonette et al. |
| 2016/0124400 A1 | 5/2016 | Kanayama et al. |
| 2017/0047742 A1 | 2/2017 | Narla |
| 2018/0331543 A1 | 11/2018 | Palombini et al. |
| 2019/0079473 A1 | 3/2019 | Kumar et al. |
| 2020/0005405 A1 | 1/2020 | Cui et al. |
| 2020/0021236 A1 * | 1/2020 | Pan ....................... H02J 7/35 |
| 2020/0259358 A1 | 8/2020 | Hansen et al. |

FOREIGN PATENT DOCUMENTS

EP       3 796 506 A1    3/2021

* cited by examiner

*Primary Examiner* — David V Henze-Gongola
(74) *Attorney, Agent, or Firm* — Foley & Lardner LLP

(57) ABSTRACT

The present disclosure provides systems and methods for flexible renewable energy power generation. The present disclosure also provides systems and methods for firming power generation from multiple renewable energy sources.

20 Claims, 18 Drawing Sheets

FIG. 13B

SYSTEMS AND METHODS FOR FLEXIBLE RENEWABLE ENERGY POWER GENERATION

CROSS-REFERENCE TO RELATED APPLICATIONS

This application is a continuation of U.S. application Ser. No. 17/330,252, filed May 25, 2021, which is a continuation of U.S. patent application Ser. No. 17/328,760, filed May 24, 2021, each of which is incorporated by reference herein in its entirety.

BACKGROUND

Renewable energy system ("RES") power plants provide power to an electrical grid via a renewable energy source. An RES may be paired with an energy storage system ("ESS") that can store electrical power generated by the RES. The combination of an RES and an ESS may be referred to as an RES-ESS system.

Electrical grid operators must be prepared for scheduled and unscheduled outages of power plants as well as unexpected increases in power demand. An RES-ESS system may utilize the energy stored in the ESS to provide energy during power outages or increased power demand. Current RES-ESS systems may be sized inappropriately or may not operate in an efficient manner, leaving an insufficient amount of energy stored in the ESS to provide to the grid during power outages or increased power demand.

In addition to being prepared for scheduled and unscheduled outages of power plants and unexpected increases in power demand, electrical grid operators need a steady supply of power to provide for the grid's everyday power needs. This may prove difficult when energy is supplied from a renewable energy source. For example, a solar array can only generate electrical power when exposed to sunlight, and a wind farm can only generate electrical power when there is enough wind to do so. This fluctuation in electrical power generation from renewable energy sources may make it difficult to provide a predictable and steady amount of energy to an electrical grid. Therefore, there exists a need for an RES-ESS system that can supply steady energy to an electrical grid while also being available to provide energy during power outages and times of increased power demand.

SUMMARY

The present disclosure provides systems for renewable energy power plants and methods of controlling the same. In some embodiments of the present disclosure, a system comprises a renewable energy system ("RES") configured to generate electrical power from a renewable energy source. The RES may comprise a plurality of RES inverters having a first aggregate power capacity. The aggregate power capacity of the RES inverters may be defined by the characteristics of their internal components (e.g., switches, transformers, wires, etc.). The plurality of RES inverters may be used to convert direct current ("DC") power generated by the RES to alternating current ("AC") power. The RES inverters may also be used to control the amount of power generated by the RES. The system may also comprise an energy storage system ("ESS") configured to store energy from the RES and/or from the power grid. In some cases, the ESS may comprise a plurality of batteries. The system may also comprise a plurality of ESS inverters having a second aggregate power capacity. The plurality of ESS inverters may be used to convert DC power stored in the ESS to AC power usable by a power grid, to convert AC power from the power grid to DC power usable by the ESS, or to convert AC power from the RES inverters to DC power usable by the ESS. The plurality of ESS inverters may also be used to control the amount of power discharged by the ESS. The system may also comprise a controller communicatively coupled to the plurality of RES inverters and the plurality of ESS inverters configured to operate the RES-ESS in a normal mode, a capacity boost period of the normal mode, and a peaker mode. During a normal mode, the controller may limit a combined power output of the plurality of RES inverters and the plurality of ESS inverters to a maximum normal power limit During a capacity boost period of the normal mode, the controller may cause the ESS to discharge through the plurality of ESS inverters to supplement the electrical power generated by the RES system. During a peaker mode, the controller may limit the combined power output of the plurality of RES inverters and the plurality of ESS inverters to a maximum peaker power limit.

The system described above provides several improvements to the technical field of renewable energy power generation. Historically, powerplants were thermal powerplants and separate peaker powerplants were gas turbines or internal combustion engines that could increase generation quickly when additional power was needed and then turn off quickly when the peak load passes. Traditional high capacity factor powerplants are generally either combined cycle gas turbines, coal-fired powerplants, nuclear power or other generators that use steam to turn electricity generators. Steam power systems need a long time to start up, because a large volume of water needs to be brought up to temperature and steam turbines need to be brought up to speed. Thus, traditional peaker systems are inefficient at ramping to peak load because of the amount of time it takes for a steam powered system to be cycled on and off. The system of the present disclosure provides a renewable energy system that acts both as a high capacity factor (a.k.a. "baseload") powerplant and as a peaker powerplant. The system limits an RES-ESS system to operate at no higher than a maximum normal power limit during a normal mode to ensure a maximum amount of energy is stored in the ESS to discharge for an extended time and thus maximize the effective capacity factor, while also being available for emergency use. The peaker mode allows the RES-ESS to discharge extra energy to meet increased demand. The system can quickly switch between a normal mode and a peaker mode to provide energy as needed on a moment's notice. The capacity boost period of the normal mode also ensures sufficient power is provided to the power grid through the ESS when the RES cannot provide enough energy by itself.

The systems of the present disclosure can also implement methods for providing steady or "firmed" power to a particular node of a power grid. Such a method may comprise controlling the combined power delivered to a node of a power grid by (1) a first renewable energy power plant (REPP) comprising an RES and an ESS and (2) a second or multiple other renewable energy power plants. The method may comprise, for each of a plurality of times, setting a desired combined power output to the node. The desired power output may be at most the maximum combined power output of the RES and the ESS. The method may comprise determining a power output of the second renewable energy power plant at a time. Determining the power output of the second renewable energy power plant allows the system to determine the amount of power that the RES and ESS should generate to maintain the desired combined power output to the node. The method may comprise determining a difference between the desired combined power output to the node and the power output of the second or multiple other renewable energy power plants at the time. The method may comprise determining a power output capability of the RES at the time. Determining the power output capability of the RES at the time allows the system to determine the amount of power that the ESS should charge or discharge, or the degree to which the RES production should be curtailed, to maintain the desired combined power output to the node. The method may comprise determining a desired power output of the ESS such that a sum of the power output capability of the RES and the desired power output of the ESS is substantially equal to the difference. The method may further comprise, setting an actual power output of the ESS to be substantially equal to the desired power output of the ESS such that an actual power output of the REPP is substantially equal to the difference.

The method described above provides several improvements to the technical field of renewable energy power generation. The method allows a REPP to provide firm energy to a node of a power grid. The REPP may use current and/or forecast energy production data of the RES, ESS, and second renewable energy power plant to determine how much energy each component of the REPP needs to provide in order to reach the combined power output to the node. The method allows the REPP to predict the power output demands and prepare the RES, ESS, and second or more renewable energy power plants to meet the energy needs.

In an aspect, the present disclosure provides a system for generating power for a power grid. The system may comprise (a) a renewable energy system ("RES") configured to generate electrical power from a renewable energy source; (b) a plurality of RES inverters having a first aggregate power capacity; (c) an energy storage system ("ESS") configured to store energy from the RES or the power grid; (d) a plurality of ESS inverters having a second aggregate power capacity; and (e) a controller communicatively coupled to the plurality of RES inverters and the plurality of ESS inverters, wherein the controller is programmed to: (i) during a normal mode, limit a combined power output of the plurality of RES inverters and the plurality of ESS inverters to a maximum normal power limit, (ii) during a capacity boost period of the normal mode, cause the ESS to discharge through the plurality of ESS inverters to supplement the electrical power generated by the RES, and (iii) during a peaker mode, limit the combined power output of the plurality of RES inverters and the plurality of ESS inverters to a maximum peaker power limit, wherein the maximum peaker power limit is greater than the maximum normal power limit, wherein the first aggregate power capacity, the second aggregate power capacity, or a sum of the first aggregate power capacity and the second aggregate power capacity is greater than or equal to the maximum peaker power limit.

In another aspect, the present disclosure provides a method for controlling the combined power delivered to a node of a power grid by (1) a first renewable energy power plant ("REPP") comprising a renewable energy source ("RES"), and an energy storage system ("ESS") and (2) a second renewable energy power plant (REPP), wherein the first REPP and the second REPP have different points of interconnection to the power grid, the method comprising, for each of a plurality of times: (a) setting a desired combined power output to the node, wherein the desired combined power output is at most a maximum combined power output of the RES, the ESS, and the second REPP; (b) determining a power output of the second REPP at the time; (c) determining a difference between the desired combined power output to the node and the power output of the second REPP at the time; (d) determining a power output capability of the RES at the time; (e) determining a desired power output of the ESS such that a sum of the power output capability of the RES and the desired power output of the ESS is substantially equal to the difference; and (f) setting an actual power output of the ESS to be substantially equal to the desired power output of said ESS such that an actual power output of said first REPP is equal to said difference.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 13B is a chart illustrating wind power generation at a facility in each hour and month of a year.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

I. RES-ESS SYSTEMS

Embodiments described in the present application document include an integrated renewable energy source ("RES") (e.g., solar array, wind turbine, etc.) and energy storage system ("ESS") (e.g., a battery system, a compressed air system, a pumped water system) facility or plant. The combination may be referred to here as RES-ESS, an RES-ESS system, or an RES-ESS facility. An RES-ESS system can reach a desired state of charge ("SOC") by charging the ESS with power produced by the RES or power from the power grid. In certain embodiments, an RES-ESS system will reach the desired SOC by prioritizing charging at times when RES generation is high. For example, an ESS may be charged more when more RES generation is available, and an ESS may be charged less (or not at all) when RES generation is limited. The ESS may be discharged when RES generation is limited or unavailable.

In certain embodiments, an RES-ESS system will charge the ESS exclusively from the RES, so that a maximum investment tax credit (ITC) can be utilized to reduce the effective cost of the facility. In certain embodiments, the ESS may additionally be charged from an electric grid connected to the RES-ESS system.

Figure 1:
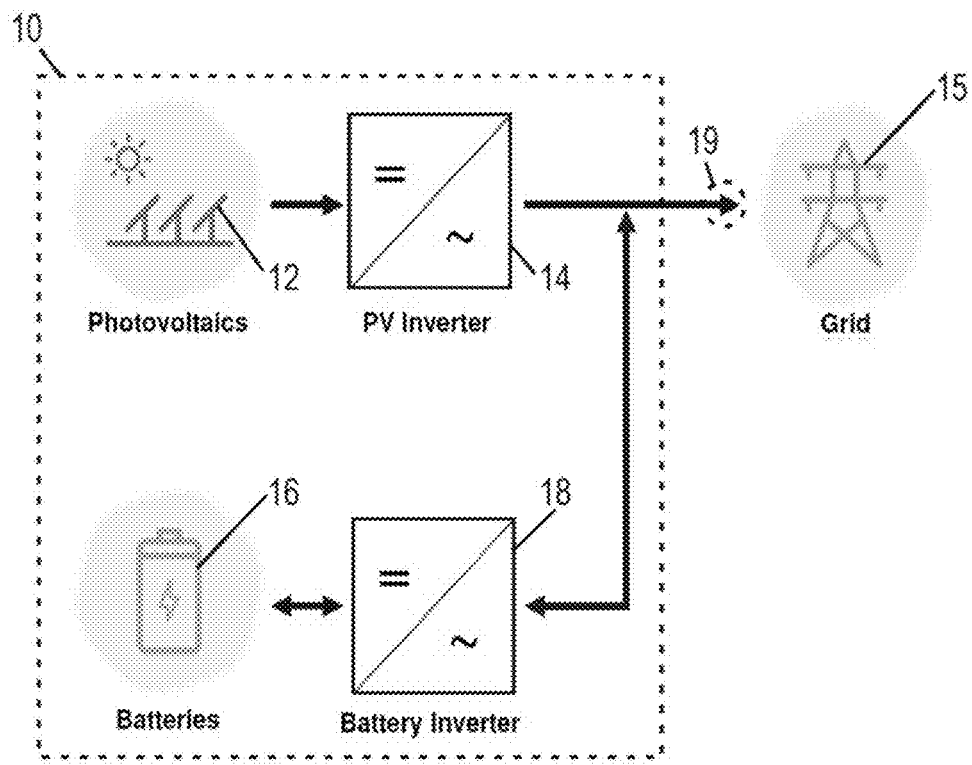
FIG. 1 schematically illustrates an AC-coupled renewable energy system-energy storage system ("RES-ESS system"), according to some embodiments of the present disclosure.
Figure 2:
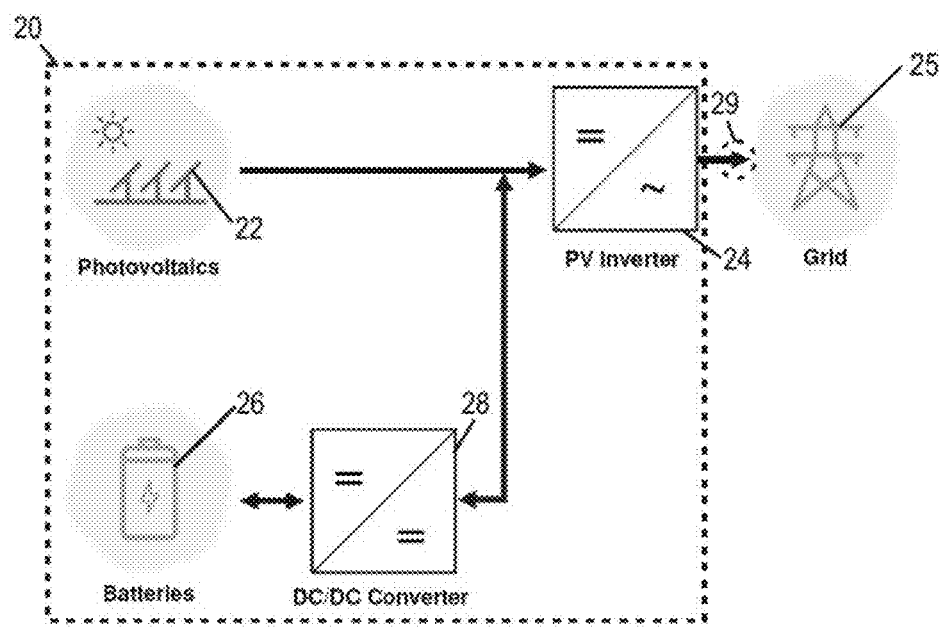
FIG. 2 schematically illustrates a DC-coupled RES-ESS system, according to some embodiments of the present disclosure.

To provide context for a subsequent discussion of coupling between an RES-ESS system and an AC electric grid, reference is made to FIGS. 1 and 2.

FIG. 1 schematically illustrates an AC-coupled RES-ESS system 10 coupled to an AC electric grid 15, according to some embodiments of the present disclosure. The AC-coupled RES-ESS system 10 may have a first power inverter 14 (e.g., a DC/AC inverter) associated with an RES 12 (e.g., a photovoltaic array) and a second power inverter 18 (e.g., a DC/AC inverter) associated with an ESS 16 (e.g., one or more batteries). The first power inverter 14 may be disposed between the RES 12 and a grid interconnection point 19. The second power inverter 18 may be disposed (i) between the ESS 26 and the grid interconnection point 19, and (ii) between the first power inverter 14 and the grid interconnection point 19. The RES 12 can produce DC electric power, and the first power inverter 14 can convert the RES DC electric power to RES AC electric power. The second power inverter 18 can (a) convert RES AC electric power to ESS DC electric power when charging the ESS 16 with RES AC electric power, and (b) convert ESS DC electric power to ESS AC electric power when discharging the ESS AC electric power to the electric grid 15. In this regard, the second power inverter 18 provides bidirectional power conversion utility. The ESS 16 (e.g., batteries) and second power inverter 18 may be located in a single area (e.g., a single centralized enclosure) to provide lower costs of installation and maintenance. Although the first and second power inverters 14, 18 have been described in a singular sense, it is to be appreciated that the first power inverter 14 and the second power inverter 18 each represent at least one power inverter that may encompass any suitable number of individual power inverters. The first and second power inverters 14, 18 can also control the power output of the RES 12 and ESS 16. The amount of power coming from the RES 12 and ESS 16 depends on the voltage and current derived from the RES 12 and ESS 16. A high voltage and low current, and a low voltage with high current both lead to little or no power. The inverters can control the power by increasing or reducing the current flowing from the RES 12 and ESS 16 in order to reach a desired power output. For example, to limit the power flowing from the RES 12, the first power inverter 14 of the RES 12 may reduce the current flowing from the RES 12, leading to an increase in the voltage produced by the RES 12.

In some embodiments, the RES 12 of the RES-ESS system can be one or more wind turbines. The RES 12 can produce AC electric power directly from the wind turbines, and, instead of using an inverter to convert DC electric power to AC electric power, the RES can utilize an AC-AC converter to transmit the electric power generated by the wind turbines to the power grid. The AC-AC converter may be a transformer or any other suitable converter such as a cycloconverter, hybrid matrix converters, matrix converters, AC voltage controllers, or the like.

FIG. 2 schematically illustrates a DC-coupled RES-ESS system 20 coupled to an AC electric grid 25, according to some embodiments of the present disclosure. The DC-coupled RES-ESS may have a DC/DC converter 28 associated with an ESS 26 and a power inverter 29 that provides power conversion utility for both the RES 22 and the ESS 26. The power inverter 29 can convert DC electric power received from the RES 22 and/or the ESS 26 to AC electric power to feed AC electric power through a grid interconnection point 29 to the AC electric grid 25.

Although a DC-coupled RES-ESS system 20 according to FIG. 2 may exhibit lower conversion losses (due to reduced need for power conversion), components (e.g., batteries) of the ESS 26 may need to be spread around an RES-ESS system 20 proximate to components of the RES 22 to avoid low voltage power dissipation. This may necessitate an increased number of containers or enclosures for components of the ESS 26, thereby increasing costs for installation and maintenance. The capital cost for a DC-coupled RES-ESS system 20 according to FIG. 2 is expected to be higher than an AC-coupled RES-ESS system 10 according to FIG. 1.

One aspect of the present disclosure is directed to an "AC overbuilt" RES-ESS system, with ESS capacity and RES inverter capacity being larger than conventional facilities, and with RES inverter capacity being larger than a point of grid interconnect (POGI) limit for the facility. Before discussing an AC overbuilt RES-ESS system in greater detail, however, components of an RES-ESS system and an accompanying utility interface will be introduced first, with reference to FIGS. 3A, 3B, and 3C.

Figure 3A:
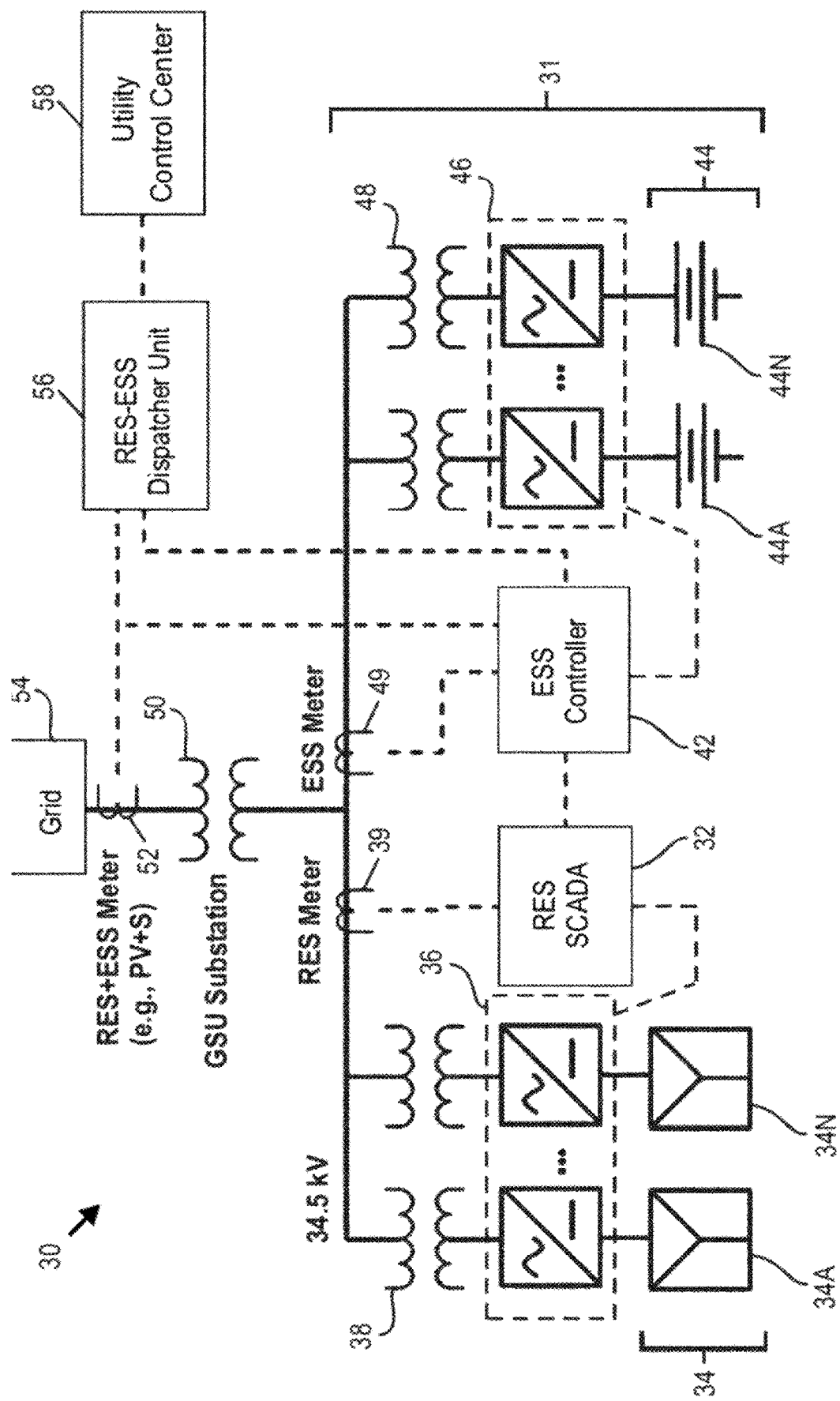
FIG. 3A schematically illustrates interconnections between various components of an AC coupled metering and control system for controlling an RES and ESS, according to some embodiments of the present disclosure.

FIG. 3A schematically illustrates interconnections between various components of an AC coupled metering and control system 30 for controlling a renewable electrical energy generation device 34 including multiple generation units 34A-34N (such as a solar photovoltaic (PV) array including photovoltaic units) and an energy storage device 44 including multiple energy storage units 44A-44N (such as a battery array including battery units) chargeable with electric power produced by the renewable electrical energy generation device 34 in an RES-ESS system 31 according to some embodiments of the present disclosure. The RES-ESS system 31 may combine a renewable electrical energy generation device 34 (e.g., such as an array of PV panels, wind turbines, or the like), and an energy storage device 44 (e.g., an array of lithium-based batteries) that may be coupled to a single substation 50 and/or located in a single property, area, or structure.

FIG. 3A illustrates an AC-coupled RES-ESS system 31 that uses power inverters 36, 46 (e.g., rectifier-based or other appropriate power converters) to convert DC power produced by a renewable electrical energy generation device 34 (e.g., a solar PV array in certain embodiments) or power released by the energy storage device 44 to AC power for coupling to an AC electrical grid 54), but in certain embodiments, the RES-ESS system 31 may embody a DC coupled RES-ESS system.

In certain embodiments, an energy storage device 44 may include at least one of (or a combination of) batteries 44A, 44B using various constructions and chemistries, capacitors, or mechanical energy storage devices such as flywheels or pumped-hydro installations. In certain embodiments, an energy storage device 44 may include at least one hydrolysis unit (e.g., configured to electrolyze water to release hydrogen), optionally combined with hydrogen consuming electricity producing element (e.g., a fuel cell array or gas turbine) and/or a hydrogen storage unit (e.g., adsorbent media for releasably binding hydrogen, storage vessels, and/or reversible chemical reactant vessels or beds).

In certain embodiments, a fast-following load may be substituted for an ESS to effectuate smoothing of output of an RES facility at a POGI limit A fast-following load may dissipate energy quickly (e.g., for industrial use) without necessarily promoting energy storage. One non-limiting example of a fast-following load would be a rock crusher.

Control methods involving an RES-ESS system as disclosed herein may utilize accurate renewable energy production forecasts (e.g., for PV production or wind production) into implementations for controlling components of an RES-ESS system, as well as state of charge (SOC) schedules for an ESS of such a facility.

In certain embodiments, an RES-ESS dispatcher unit 56 has the ability to control the charge or discharge of the energy storage device 44 (e.g., batteries) by communicating with an ESS controller 42, which may be located in the RES-ESS system 31. An RES SCADA (supervisory control and data acquisition) controller 32 is operatively coupled with RES inverters 36 associated with the renewable electrical energy generation device 34 (optionally embodied in a solar PV array), and the ESS controller 42 is operatively coupled with ESS inverters 46 associated with the energy storage device 44, with both the RES SCADA controller 32 and the ESS controller 42 being in communication with the RES-ESS dispatcher unit 56. In certain embodiments, a utility control center 58 (e.g., of an electric power utility or grid operator) may communicate with the RES-ESS dispatcher unit 56 using DNP3 and set different configuration options. Additionally, the RES-ESS dispatcher unit 56 receives (or generates) an accurate renewable generation forecast (e.g., solar generation forecast) that it uses to implement any desired control modes. As shown in FIG. 3A, certain embodiments may utilize readily available electric power meters, such as an RES-ESS electrical power meter 52 to measure RES-ESS facility output, an RES electrical power meter 39 to measure RES output, and an ESS electrical power meter 49 to measure ESS output. Signals from the RES electrical power meter 39 are provided to the RES SCADA controller 32, and signals from the ESS electrical power meter 49 are provided to the ESS controller 42. The electric power generated by the RES-ESS system 31 may be provided to an electric power system (e.g., an AC electrical grid 54) via a generator step-up (GSU) substation 50 that implements protection and appropriate voltage conversion. RES transformers 38 and ESS transformers 48 may be arranged between the inverters 36, 46, respectively, and the GSU substation 50 to provide voltage conversion utility (e.g., to supply AC power signals to the GSU substation 50 at 34.5 kV in certain implementations).

Figure 3B:
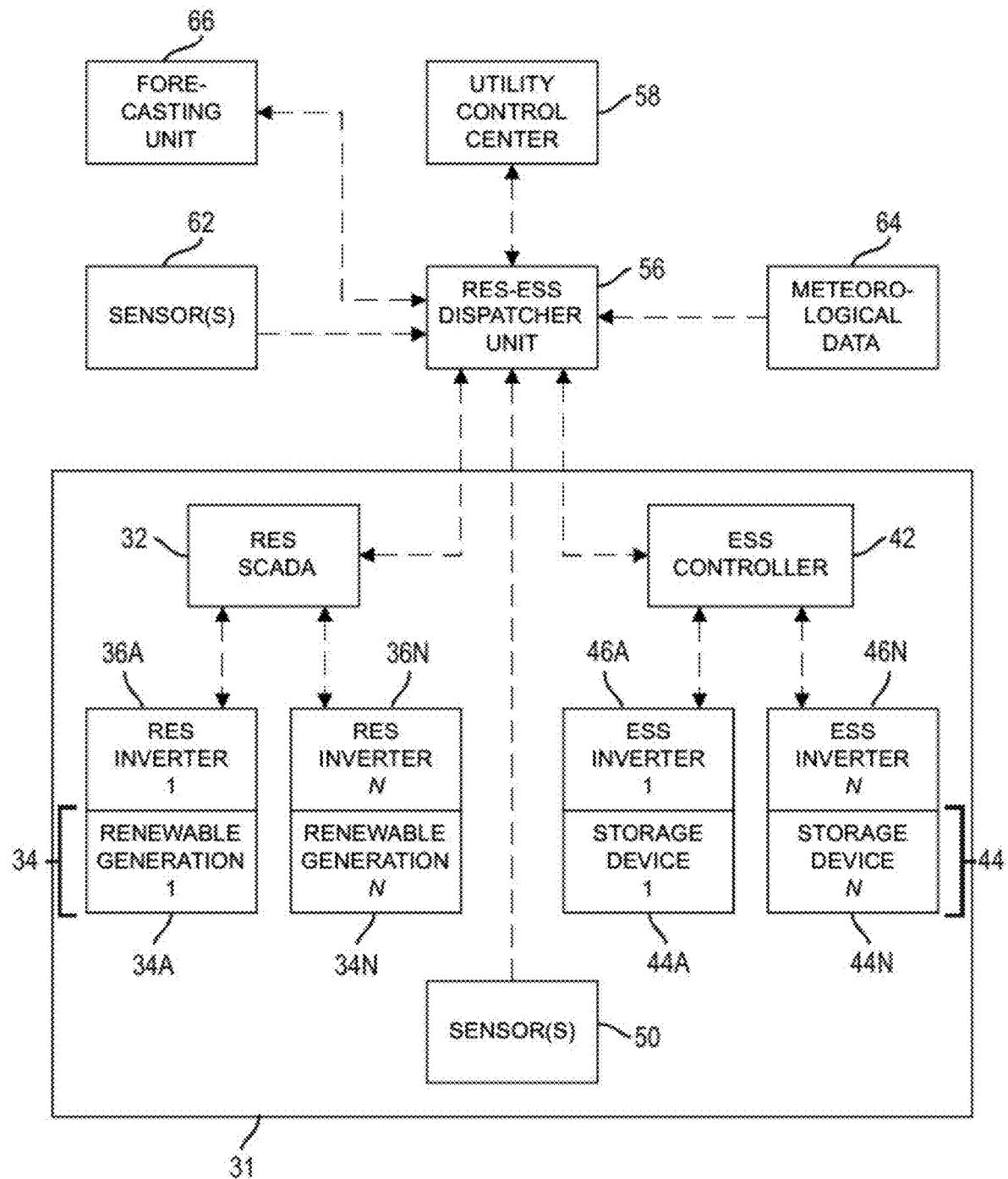
FIG. 3B schematically illustrates certain components of the AC coupled metering and control system of FIG. 3A.

FIG. 3B schematically illustrates certain components of the AC coupled metering and control system of FIG. 3A, including interconnection of control- and sensor-related components, according to some embodiments of the present disclosure. As shown in FIG. 3B, the RES-ESS dispatcher unit 56 is disposed between a utility control center 58 and an RES-ESS system 31. Within the RES-ESS system 31, an RES SCADA controller 32 is operatively coupled with RES inverters 36A-36N (wherein N represents any suitable number) that are configured to provide AC conversion of DC power produced by renewable electrical energy generation units 34A-34N (e.g., arrangeable as parts of a renewable electrical energy generation device 34). Similarly, within the RES-ESS system 31, an ESS controller 42 is operatively coupled with ESS inverters 46A-46N that are configured to provide AC conversion of DC power supplied by energy storage units 44A-44N (e.g., arrangeable as parts of an energy storage device 44). The RES-ESS system 31 further includes at least one sensor 50, which may comprise one or more sky imaging sensors useful to determine sky conditions (such as presence of clouds) proximate to the RES-ESS system 31, with output signals from the at least one sensor 50 being supplied to the RES-ESS dispatcher unit 56. The RES-ESS dispatcher unit 56 may also receive: (i) signals from one or more sensors 62 (e.g., satellite imaging sensors or the like) not necessarily associated with the RES-ESS system 31; (ii) meteorological data provided by a meteorological modeling unit 64; (iii) signals from a forecasting unit 66 that may forecast generation by the renewable electrical energy generation device 34 and/or one or more other renewable electrical energy generation devices or units. In certain embodiments, time-dependent forecasting of electrical energy production may be performed by the forecasting unit 66 or may be performed by the RES-ESS dispatcher unit 56. In certain embodiments, a time-dependent forecast of electrical energy production may utilize one, two, or all three (e.g., as an ensemble of two or more) of the following: on-site sky imaging provided by the sensor(s) 50, satellite imaging provided by the sensor(s) 62, and meteorological data provided by the meteorological modeling unit 64. In certain embodiments, sensors of other types may be used.

Figure 3C:
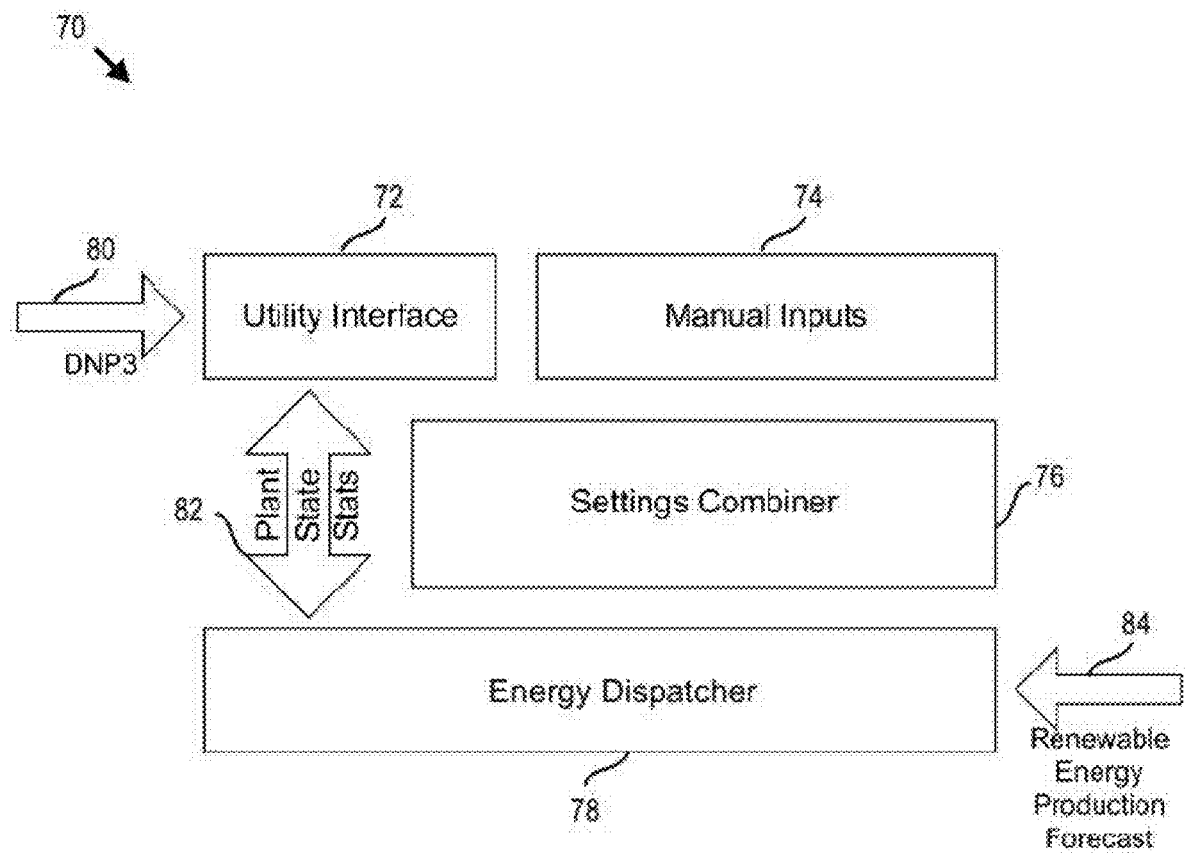
FIG. 3C is a block diagram for a processor-based energy dispatch control system for dispatching an RES and an ESS device chargeable with electric power produced by the RES, according to some embodiments of the present disclosure.

FIG. 3C is a block diagram showing for a processor-based energy dispatch control system 70 for dispatching an RES-ESS facility (e.g., including renewable electrical energy generation resource and an electrical energy storage device chargeable with electric power produced by the renewable electrical energy generation resource) according to some embodiments of the present disclosure. The control system 80 includes as functional blocks a utility interface 72, manual inputs 74, a settings combiner 76, and an energy dispatcher 78. The utility interface 72 communicates with an electric power system utility, and with the energy dispatcher 78 to receive configuration commands (e.g., mode configuration commands) and send plant status and state information 82. An example of a coordinated charge-discharge mode configuration set by a utility may be a schedule that contains a first SOC target at a pre-determined time, and a second SOC target at a second pre-determined time. For example, the utility may want the ESS to reach an SOC of 90% by 5:00 PM and an SOC of 10% by 10:00 PM. The utility interface 72 receives DNP3 (Distributed Network Protocol) information via a DNP3 link 70, and is responsible for converting the published DNP3 configuration points to internal data structures. The utility interface 72 is also responsible for communicating any data structure changes back to the utility via the DNP3 link 80. Manual inputs 74 include configuration parameters that are not addressable by MESA-ESS SCADA points. The settings combiner 76 validates any configuration inputs and passes them to the energy dispatcher 78 in one implementation. The settings combiner 76 receives MESA-ESS schedules/modes/curves provided by a utility or grid operator, receives schedules produced by an optimizer, and receives any potential manual inputs 74, and then produces combined schedules/modes/curves. The energy dispatcher 78 is an engine that executes control modes for the RES-ESS facility (or plant) and decides on the charge or discharge level of the ESS utilizing a renewable energy production forecast 84. The energy dispatcher 78 is responsible for controlling output of an RES-ESS facility in short time scales by observing the current state of the RES-ESS facility, utilizing time-dependent forecasts of electrical energy production by the RES, and utilizing any combined MESA-ESS schedules/modes/curves produced by the settings combiner 76. A renewable energy forecast may contain a time series of points for the power expected to be generated by the renewable energy source (e.g., solar PV array, wind turbine, etc.). Such a forecast may have a format of (timestamp, power value) and contain a set of time values of specified intervals (e.g., 15 minutes in 1 minute intervals, 36 hours in 1 hour intervals, etc.). These potential formats and timeframes are provided to illustrate the nature of an exemplary forecast, and are not intended to limit the disclosure. The energy dispatcher 78 is also responsible for passing alerts and RES-ESS plant state and/or status information back to the utility interface 72.

Figure 4A:
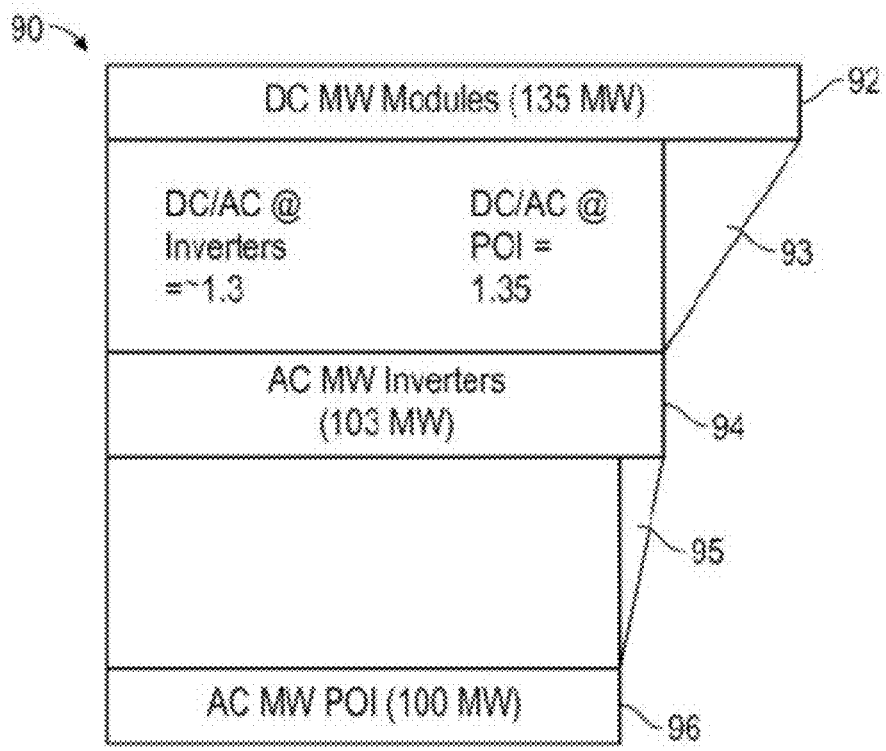
FIG. 4A is a diagram showing relative sizes of an RES, a power inverter, and a point of grid interconnect limit for a conventional RES facility coupled with an AC electric grid, according to some embodiments of the present disclosure.
Figure 4B:
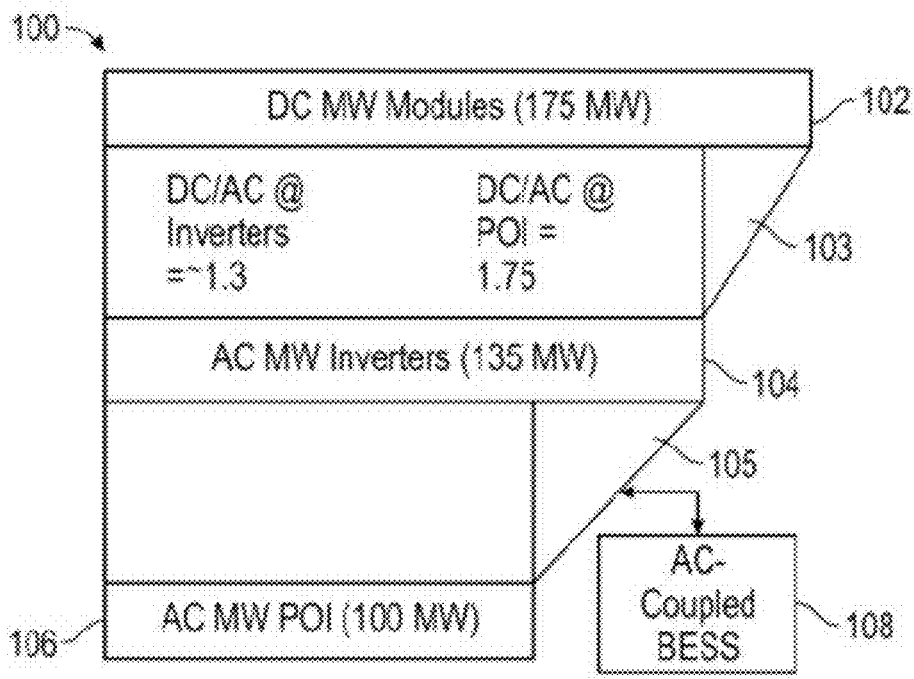
FIG. 4B is a diagram showing relative sizes of an RES, a power inverter, and a point of grid interconnect limit for an AC overbuilt RES-ESS system according to some embodiments of the present disclosure.
Figure 4C:
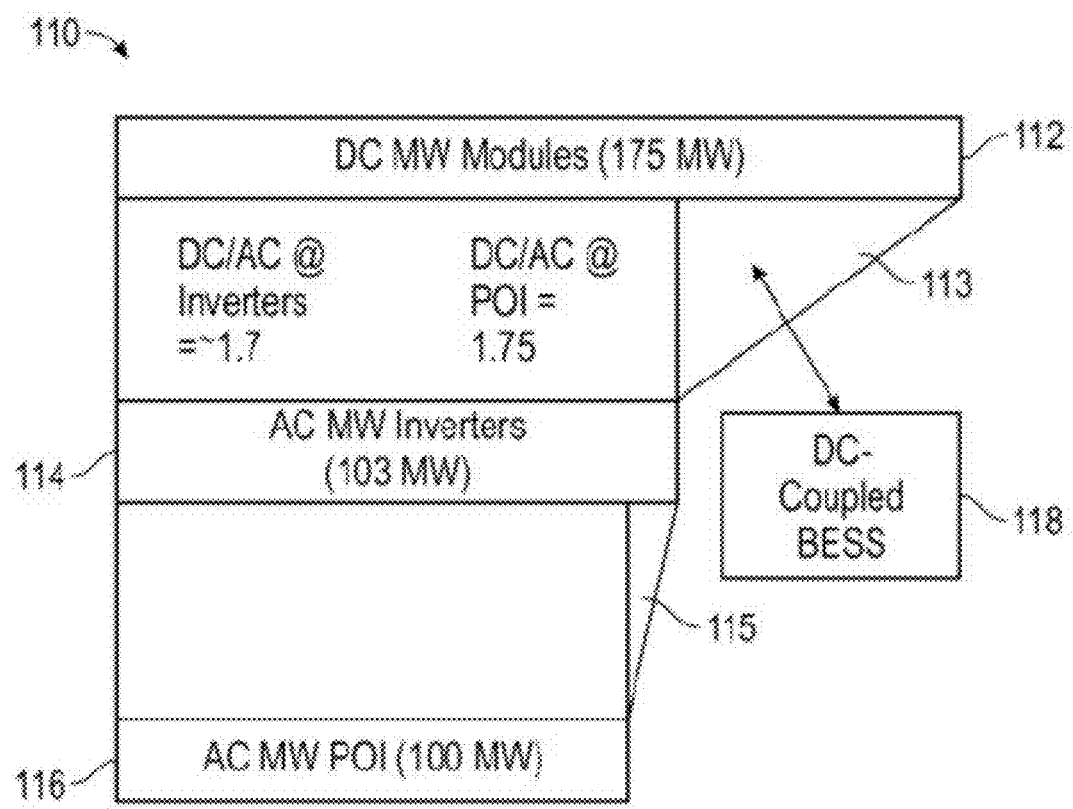
FIG. 4C is a diagram showing relative sizes of an RES, a power inverter, and a point of grid interconnect limit for a DC-coupled RES-ESS system, to permit comparison to FIG. 4B.

FIGS. 4A-4C provide basis for comparing component sizing and attributes of an AC overbuilt RES-ESS facility (according to FIG. 4B) relative to a conventional AC-coupled RES-ESS facility (according to FIG. 4A) and relative to a DC coupled RES-ESS facility (according to FIG. 4C), according to some embodiments of the present disclosure. Values for RES capacity, inverter capacity, and point of interconnect limits provided in FIGS. 4A-4C are provided to promote ease of understanding, without intending to limit a scope of protection.

FIG. 4A is a diagram showing relative sizes of an RES 92 (e.g., comprising direct current photovoltaic modules), power inverters 94, and a point of interconnect limit (previously referred to herein as POGI limit) for a conventional RES facility 90 coupled with an AC electric grid at a grid interconnection point 96, according to some embodiments of the present disclosure. As shown in FIG. 4A, the RES 92 may be configured to output 135 MW, the power inverters 94 (which serve to convert RES DC electric power to AC electric power) may have an output capacity of no greater than 103 MW, and the POGI limit may be 100 MW. A ratio of RES DC power supplied from the RES 92 to the power inverters 94 may be about 1.3, while a ratio of RES DC power to the POGI limit may be 1.35. A mismatch between RES DC power and a capacity of the power inverters 94 results in a first portion of clipped or lost energy 93, and a mismatch between the capacity of the power inverters 94 and the POGI limit results in a second portion of clipped or lost energy, that is wasted when the RES 92 is generating RES DC power at full capacity.

FIG. 4B is a diagram showing relative sizes of an RES 102 (e.g., comprising direct current photovoltaic modules), power inverters 104, and a point of interconnect limit (previously referred to herein as POGI limit) for an AC overbuilt RES-ESS facility 100 coupled with an AC electric grid at a grid interconnection point 106, according to some embodiments of the present disclosure. As shown in FIG. 4B, the RES 102 may be configured to output 175 MW, the power inverters 104 (which serve to convert RES DC electric power to RES AC electric power) may have an output capacity of 135 MW, and the POGI limit may be 100 MW. An AC-coupled ESS 108 (having an associated power inverter (not shown)) is provided to receive and store any portion of the RES AC electric output that exceeds the POGI limit, thereby avoiding feeding excess energy to the electric grid, while avoiding a potential energy loss 105 if the ESS 108 were not present. A ratio of RES DC power supplied from the RES 102 to the power inverters 104 may be about 1.3, while a ratio of RES DC power to the POGI limit may be 1.75. A mismatch between RES DC power and a capacity of the power inverters 104 results in clipped or lost energy 103 that is wasted when the RES 92 is generating RES DC power at full capacity. In certain embodiments, the capacity of the power inverters 104 may be increased relative to the value stated in FIG. 4B to one of the thresholds stated herein (e.g., to be equal to a sum of the POGI limit and the capacity of the ESS 108). If it is desired to reduce or limit the clipped or lost energy 103, the power inverters 104 may be sized to have a capacity closer or equal to an output capacity of the RES 102.

Although FIG. 4B depicts a modest degree of oversizing of an ESS and power inverters, it is to be appreciated that any suitable degree of oversizing may be provided to enable an RES-ESS to provide a desired fixed firm capacity level and desired duration with a desired degree of confidence.

FIG. 4C is a diagram showing relative sizes of an RES 112, power inverters 114, and a point of grid interconnect limit for a DC-coupled RES-ESS facility 110 coupled with an AC electric grid at a grid interconnection point 116, wherein a DC-coupled ESS 118 is arranged to receive and store RES DC electric output that exceeds the capacity of the power inverters 114 (thereby avoiding a potential energy loss 113 if the ESS 118 were not present), according to some embodiments of the present disclosure. A ratio of RES DC power supplied from the RES 112 to the power inverters 114 may be about 1.7, while a ratio of RES DC power to the POGI limit may be 1.75. A mismatch between an output capacity of the power inverters 114 and the POGI limit results in clipped or lost energy 115 that may be wasted when the RES 112 is generating RES DC power at full capacity and the power inverters 114 are operating at capacity.

II. RES-ESS SYSTEMS FOR GENERATING POWER FOR A POWER GRID

Embodiments of the present disclosure provide an RES-ESS system for generating power for a power grid. As mentioned above, the RES may comprise any renewable energy source, such as a solar PV array comprising solar cells, or a wind farm comprising wind turbines. The RES may be configured to generate electrical power from the renewable energy source. The RES may comprise a plurality of RES inverters. The RES inverters may have a first aggregate power capacity.

The RES-ESS system may also comprise an ESS configured to store energy from the RES or from the power grid. The ESS may be a battery energy storage system ("BESS") or any other type of ESS as described herein. The ESS may comprise a plurality of ESS inverters. The ESS inverters may have a second aggregate power capacity.

The RES-ESS system may also comprise a controller communicatively coupled to the plurality of RES inverters and the plurality of ESS inverters. The controller may be any controller as described herein and may be communicatively coupled as described herein. The controller may be programmed to operate the RES-ESS system in a normal mode, a capacity boost period of the normal mode, and a peaker mode.

During a normal mode, the controller may limit a combined power output of the plurality of RES inverters and the plurality of ESS inverters to a maximum normal power limit. The first aggregate power capacity of the plurality of RES inverters and the second aggregate power capacity of the ESS inverters may each be greater than the maximum normal power limit. Alternatively, the sum of the first aggregate power capacity of the plurality of RES inverters and the second aggregate power capacity of the plurality of ESS inverters may be greater than the maximum normal power limit. The combined power output of the plurality of RES inverters and the plurality of ESS inverters during a normal mode may be less than the maximum normal power limit, but the controller may ensure that the combined power output never exceeds the maximum normal power limit.

During a capacity boost period of the normal mode, the controller may cause the ESS to discharge through the plurality of ESS inverters to supplement the electrical power generated by the RES. At times, the controller may cause the ESS to discharge through the plurality of ESS inverters to completely replace the electrical power generated by the RES. The capacity boost period may come during a time when the RES is unable to produce as much electrical power as normal. For example, if the RES is a solar PV array, the capacity boost period may begin after the sun has set and the solar PV array is no longer able to generate any electrical power from the sun. Additionally, the capacity boost period may begin during a time of high cloud coverage that limits the amount of electrical power the solar PV array can generate. The energy stored in the ESS is discharged to make up for the lack of electrical power generated by the RES to ensure that the total power delivered to the grid by the ESS and RES reaches and maintains a fixed level. The fixed level may be less than the maximum normal power limit but may never exceed the maximum normal power limit. The fixed level may be determined by an operator of the RES-ESS systems, and may change from time to time, depending on the power requirements needed at the grid.

During a peaker mode, the controller may limit the combined power output of the plurality of RES inverters and ESS inverters to a maximum peaker power limit. The maximum peaker power limit may be greater than the maximum normal power limit. The combined power output of the plurality of RES inverters and ESS inverters may be less than the maximum peaker power limit but may never exceed the maximum peaker power limit during the peaker mode. Operation in a peaker mode may require that electrical power be delivered to the grid through both the RES and ESS at the same time. Thus, switching to the peaker mode may draw energy from the ESS and may limit the ability of the RES-ESS system to provide a capacity boost for a period of time after switching back to normal mode.

The RES and ESS may further comprise equipment in addition to the plurality of inverters that help deliver electrical power from the RES and ESS to the power grid. For example, the RES and ESS may comprise one or more transformers, one or more cables, and one or more switchgears configured to help deliver electrical power from the RES to the power grid. The one or more transformers, one or more cables, and one or more switchgears may have a maximum continuous power rating and an absolute maximum power rating. The one or more transformers, one or more cables, and one or more switchgears of the RES may be sized (i.e., may be selected to have a maximum continuous power rating) such that they are capable of delivering power to the power grid at a level equal to the lesser of (1) the maximum peaker power limit, or (2) the maximum power the RES is capable of producing, The RES-ESS system may be configured to operate in peaker mode for 1, 2, 3, or more hours, up to the time it would take to discharge the energy in the ESS from a fully-charged state. In some circumstances, the RES-ESS system may operate in an emergency peaker mode in which the power delivered by the RES-ESS system exceeds the maximum continuous power rating but is below the absolute maximum power rating of the above-mentioned equipment. The duration of the emergency peaker mode may be set to comply with the time limit for operating such equipment above its maximum continuous power rating.

The first aggregate power capacity of the plurality of RES inverters may be configured to be 10% lower than the maximum peaker power limit. The first aggregate power capacity of the plurality of RES inverters may be configured to be 15%, 20%, 25%, 30%, 35%, 40%, 45%, 50%, 55%, 60%, 65%, 70%, 75%, 80%, 85%, 90%, or 95% or lower than the maximum peaker power limit.

The maximum normal power limit may be configured to be not less than about 20% of the maximum peaker power limit. The maximum normal power limit may be configured to be not less than about 25%, 30%, 35%, 40%, 45%, 50%, 55%, 60%, 65%, 70%, 75%, 80%, 85%, 90%, or 95% of the maximum peaker power limit.

The maximum peaker power limit may be configured to be at least about 20%, 25%, 30%, 35%, 40%, 45%, 50%, 55%, 60%, 65%, 70%, 75%, 80%, or more, greater than the maximum normal power limit.

Figure 5A:
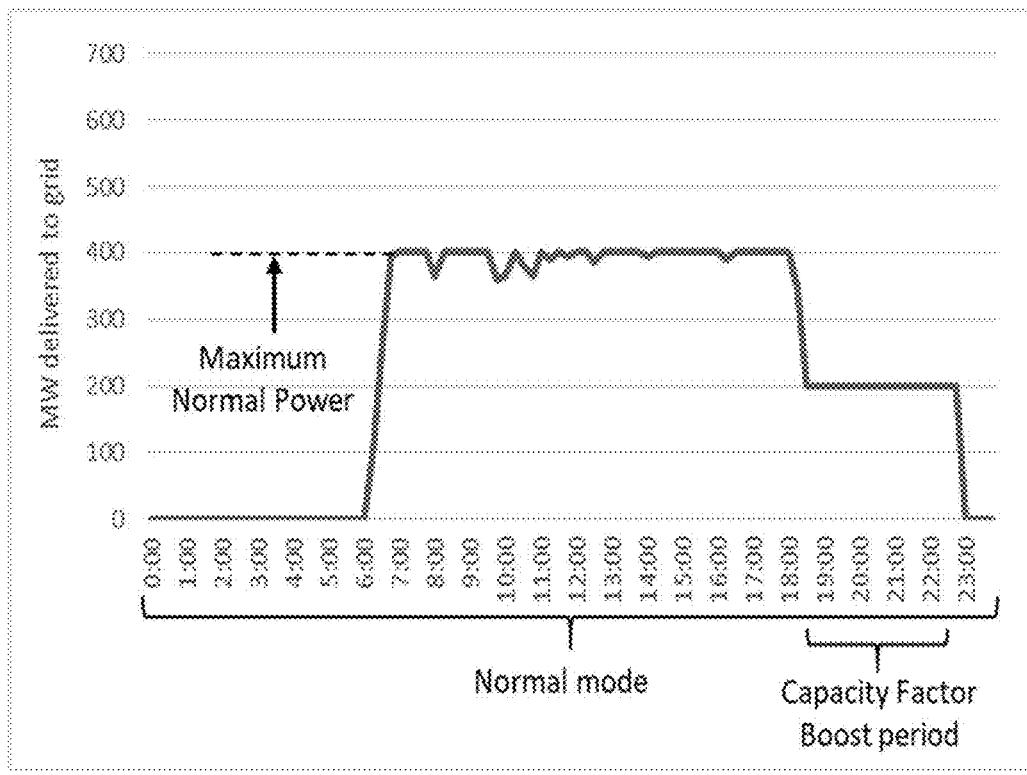
FIG. 5A is a graph illustrating power delivered to a grid by an RES-ESS system operating in a normal mode, according to some embodiments of the present disclosure.

The ESS may be configured to be charged exclusively from the RES. Alternatively, the ESS may be configured to be charged from the RES or from the power grid. In some such cases, the annual percentage of energy that comes from the grid may be limited to a certain maximum percentage. In some cases, the ESS may be configured to derive no more than about 25% of its stored energy from the power grid. Alternatively, the ESS may be configured to derive no more than about 20%, about 15%, about 10%, about 5%, or less of its stored energy from the power grid FIG. 5A is a graph illustrating power delivered to a grid by an RES-ESS system operating in a normal mode, according to some embodiments of the present disclosure. The RES in this figure may be, for example, a solar PV array. The ESS in this figure may be, for example, a BESS. As shown in FIG. 5A, the RES-ESS system begins delivering power to the grid at 6:00. This may be a time at which the solar PV array begins receiving light from the sun. During the solar day, the RES-BESS system may maintain a power level delivered to the grid near a maximum normal power limit for a period of time. If the RES generates power at a level higher than the maximum normal power limit, then this power may be stored in the BESS for later use. The RES-BESS may operate in a capacity boost period of the normal mode for a period of time where the RES output is low. During this time, the BESS may discharge energy to the power grid to supplement the power delivered by the RES.

Figure 5B:
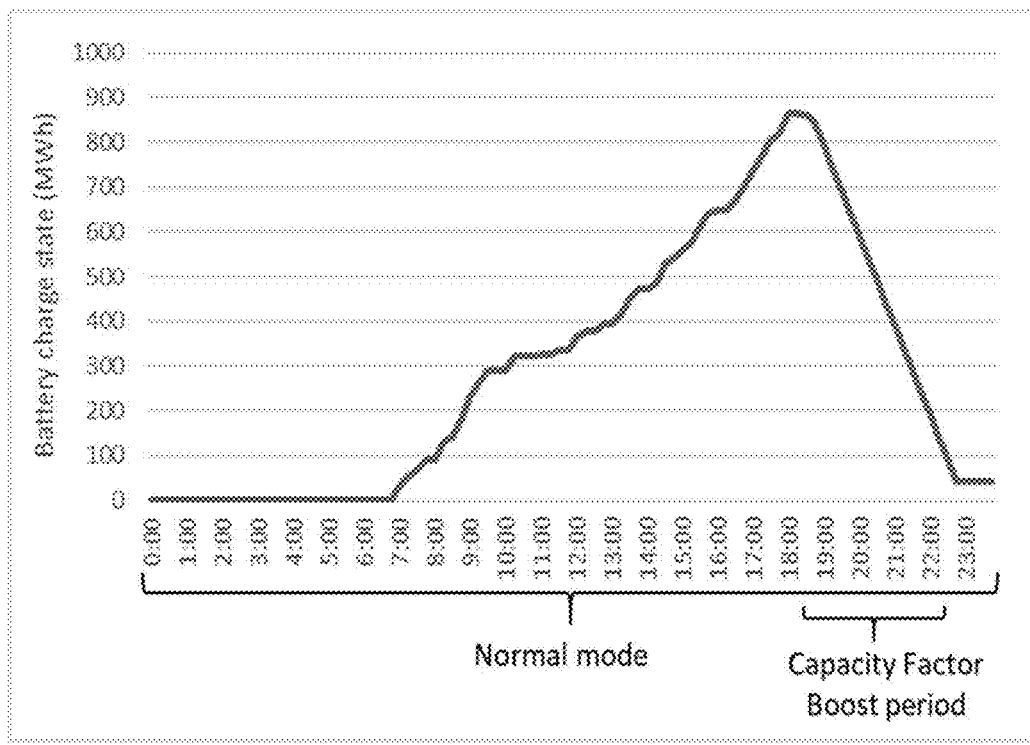
FIG. 5B is a graph illustrating the charge state of the ESS in the normal mode operation of FIG. 5A, according to some embodiments of the present disclosure.

FIG. 5B is a graph illustrating the charge state of the ESS in the normal mode operation of FIG. 5A, according to some embodiments of the present disclosure. The BESS may steadily gain charge throughout the solar day and may begin to lose its charge as it discharges energy to the power grid during the capacity boost period.

Figure 6A:
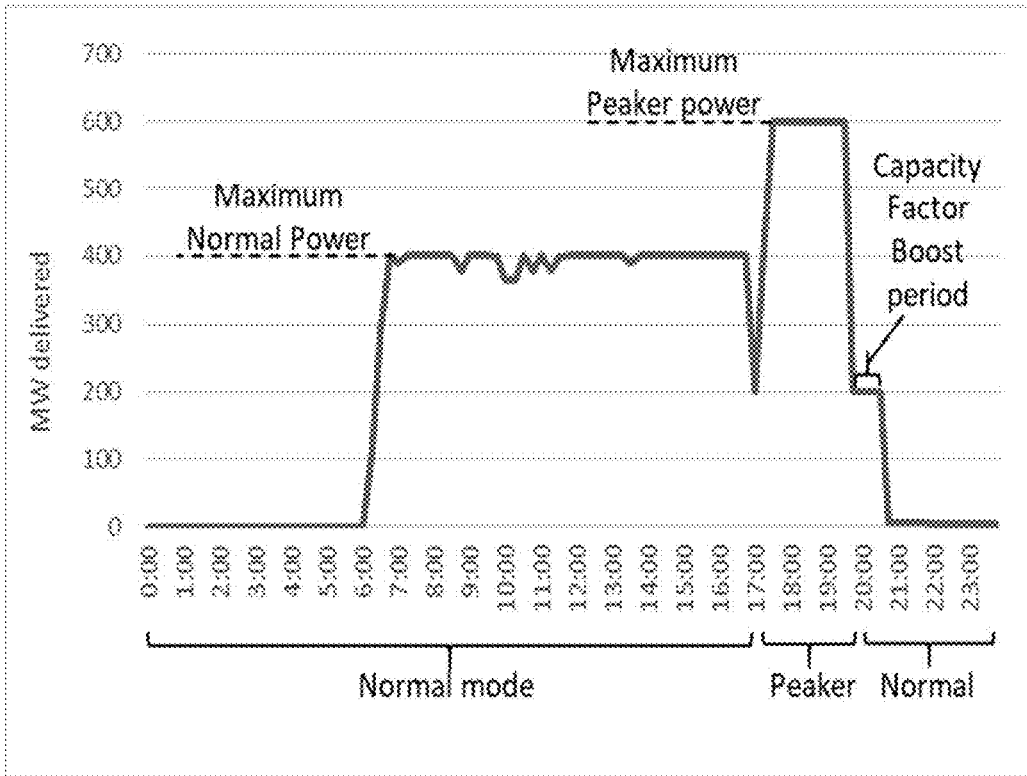
FIG. 6A is a graph illustrating power delivered to a grid by an RES-ESS system that operates in a peaker mode for a period of time, according to some embodiments of the present disclosure.

FIG. 6A is a graph illustrating power delivered to a grid by an RES-ESS system that operates in a peaker mode for a period of time, according to some embodiments of the present disclosure. As in FIG. 5A, the RES in this figure may be, for example, a solar PV array. The ESS in this figure may be, for example, a BESS. The RES-BESS system may operate similarly to the RES-BESS system in FIG. 5A, with the exception that the RES-BESS system in FIG. 6A begins to operate in a peaker mode at time 17:00. The RES-BESS may discharge a large amount of power during the peaker mode operation, which may limit the amount of time the RES-BESS system can later operate in a capacity boost period of the normal mode. The RES-BESS may switch to the peaker mode in order to meet an increased energy demand that comes in the early evening hours of a day.

Figure 6B:
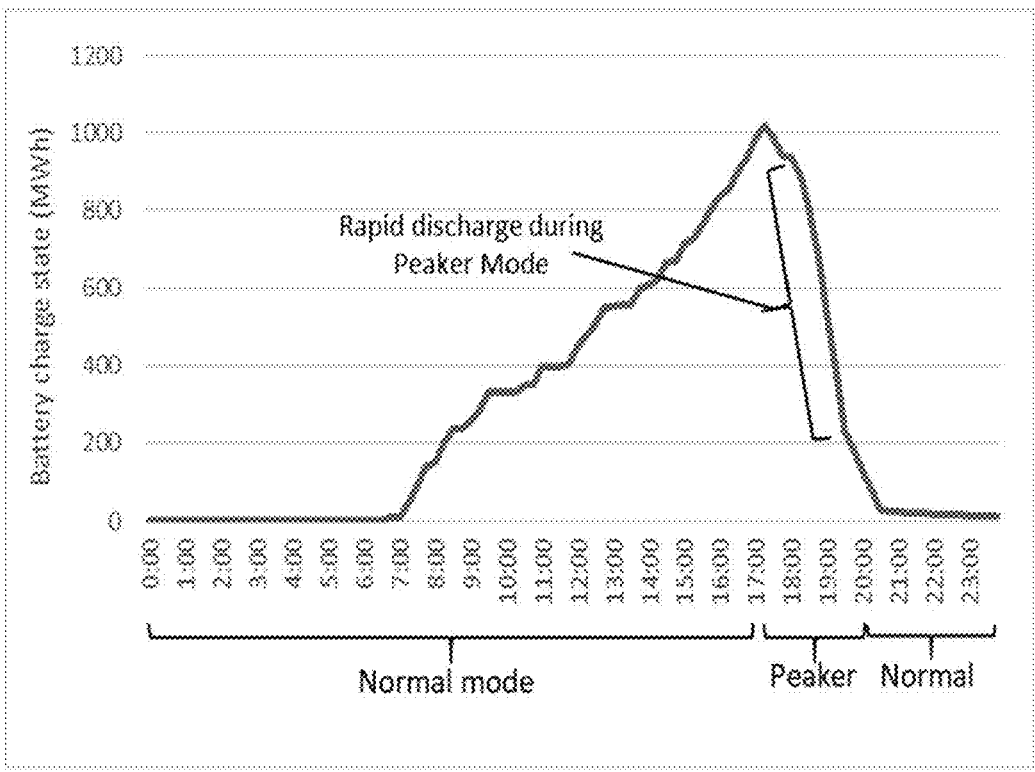
FIG. 6B is a graph illustrating the charge state of an ESS in the operation of FIG. 6A, according to some embodiments of the present disclosure.

FIG. 6B is a graph illustrating the charge state of an ESS in the operation of FIG. 6A, according to some embodiments of the present disclosure. The graph in FIG. 6B illustrates the rapid discharge of the BESS during operation in the peaker mode.

Figure 7A:
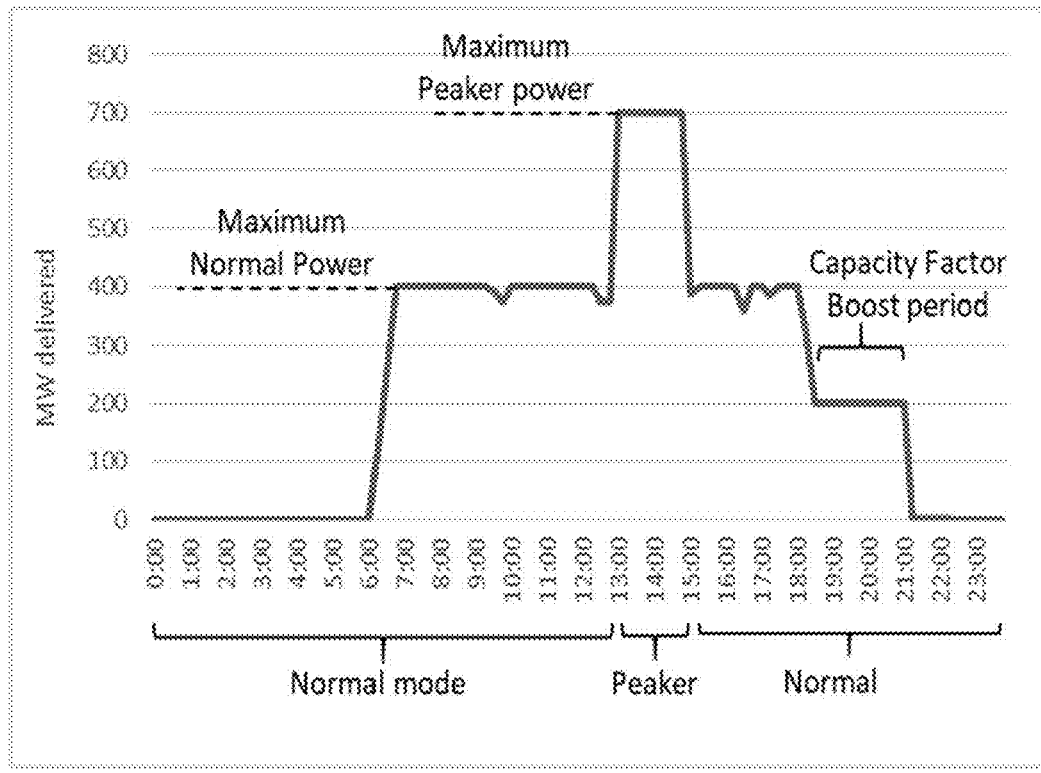
FIG. 7A is a graph illustrating power delivered to a grid by an RES-ESS system that operates in a peaker mode for a period of time, according to some embodiments of the present disclosure.

FIG. 7A is a graph illustrating power delivered to a grid by an RES-ESS system that operates in a peaker mode for a period of time, according to some embodiments of the present disclosure. As in FIG. 5A, the RES in this figure may be, for example, a solar PV array. The ESS in this figure may be, for example, a BESS. The switch to peaker mode in FIG. 7A occurs much earlier in the solar day as compared to FIG. 6A. After the RES-BESS system operates in peaker mode, the system switches back to normal mode, and then later switches to a capacity boost period of the normal mode.

Figure 7B:
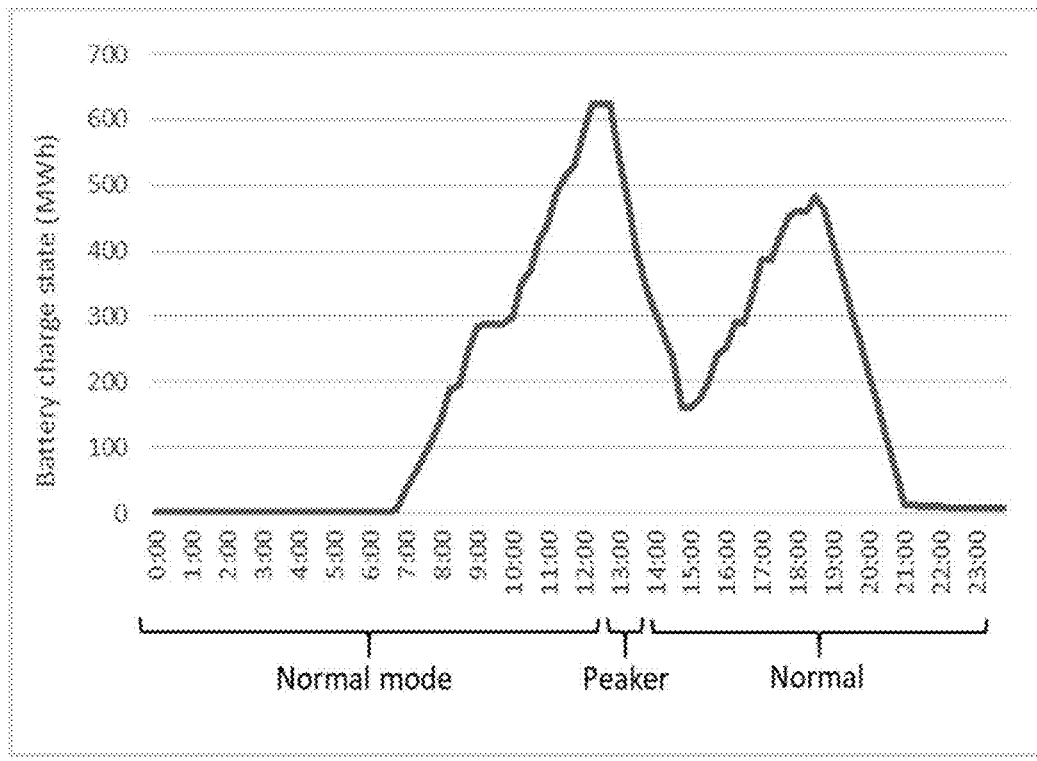
FIG. 7B is a graph illustrating the charge state of an ESS in the operation of FIG. 7A, according to some embodiments of the present disclosure.

FIG. 7B is a graph illustrating the charge state of an ESS in the operation of FIG. 7A, according to some embodiments of the present disclosure. When the RES-BESS system operates in peaker mode, the charge state of the BESS drops significantly, similar to the drop observed in FIG. 6B. However, because the operation in peaker mode occurs earlier in the day than in FIG. 6A, the BESS is able to regain some charge before the end of the solar day, which enables the RES-BESS to operate in a capacity boost period of the normal mode for a longer period of time.

Figure 8A:
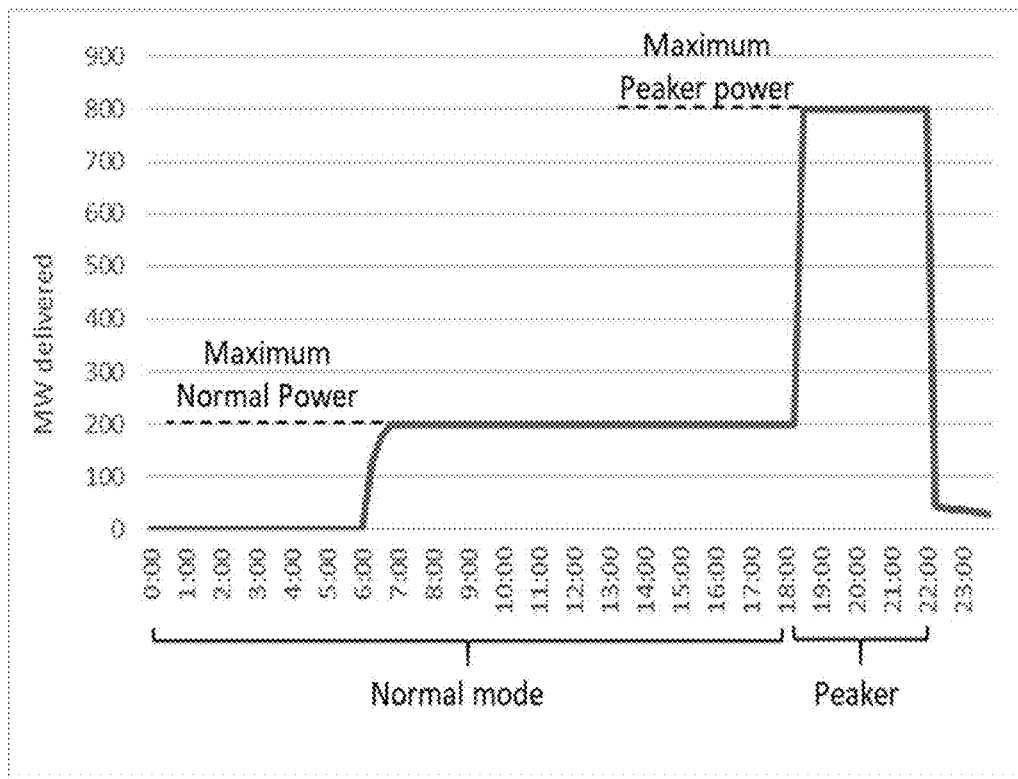
FIG. 8A is a graph illustrating power delivered to a grid by an RES-ESS system that operates as a super peaker, according to some embodiments of the present disclosure.

FIG. 8A is a graph illustrating power delivered to a grid by an RES-ESS system that operates as a super peaker, according to some embodiments of the present disclosure. As in FIG. 5A, the RES in this figure may be, for example, a solar PV array. The ESS in this figure may be, for example, a BESS. The maximum normal power limit of the super peaker system may be significantly lower than the maximum normal power limit shown in FIGS. 5A, 6A, and 7A. This lower maximum normal power limit enables the RES-BESS system to charge the BESS to a higher charge state, and thus provide electrical power during a peaker mode at a higher rate during a time of increased energy need.

Figure 8B:
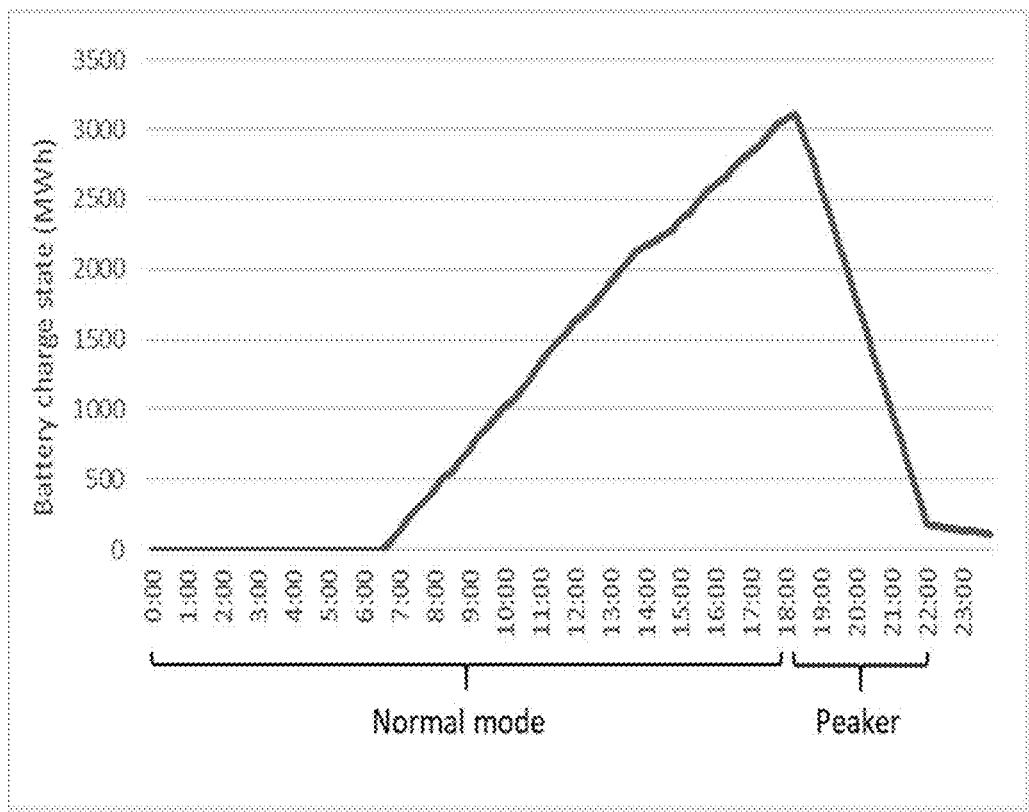
FIG. 8B is a graph illustrating the charge state of an ESS in the operation of FIG. 8A, according to some embodiments of the present disclosure.

FIG. 8B is a graph illustrating the charge state of an ESS in the operation of FIG. 8A, according to some embodiments of the present disclosure. When the RES-BESS system operates in peaker mode, the charge state of the BESS begins to drop, but at a much slower rate as compared to FIGS. 6B and 7B, due to the increased charge received during the day because of the lower maximum normal power limit.

III. REPP PROVIDING FIRMED POWER TO A POWER GRID

Figure 9A:
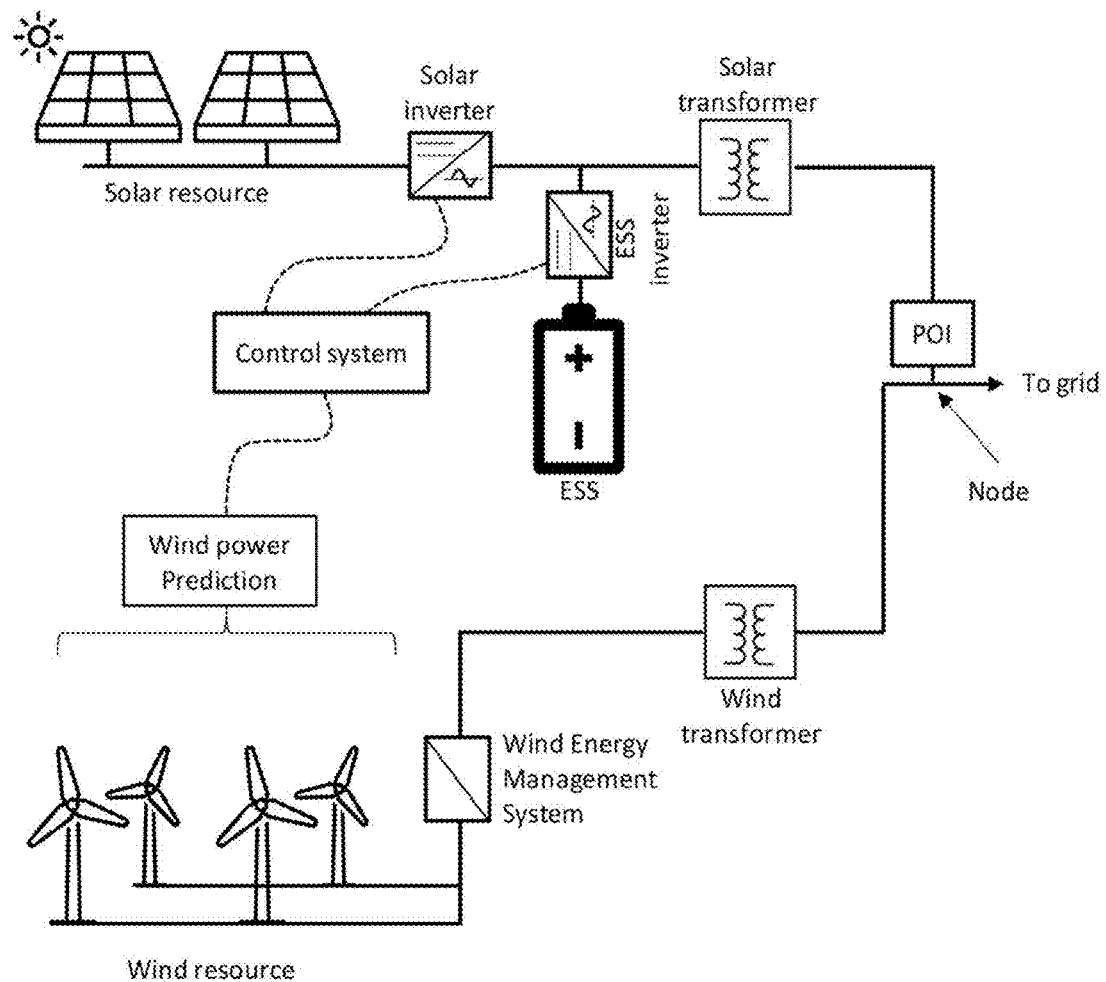
FIG. 9A-9B schematically illustrates a renewable energy power plant ("REPP") providing firmed power to a node of a power grid, according to some embodiments of the present disclosure.
Figure 9B:
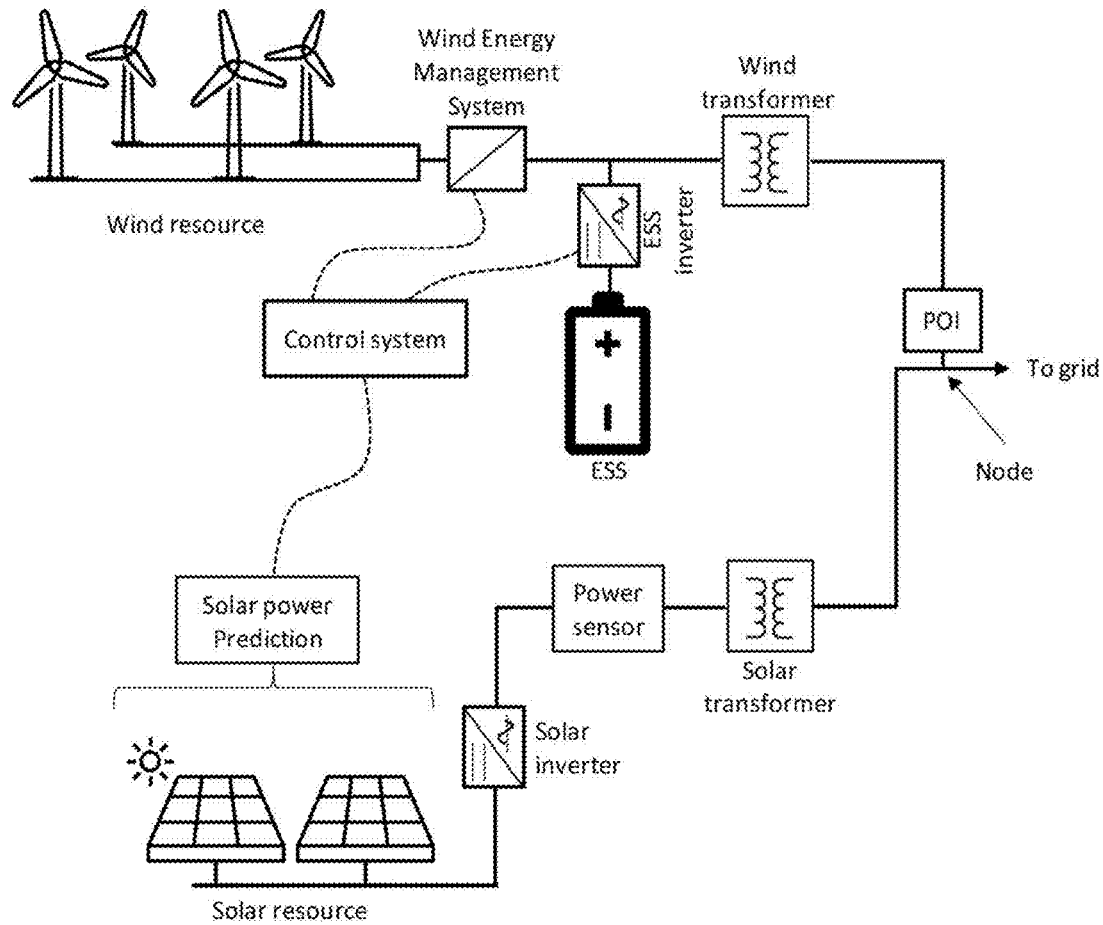

FIGS. 9A and 9B are schematic diagrams of a renewable energy power plant ("REPP") system providing firmed power to a node of a power grid, according to some embodiments of the present disclosure. The REPP may comprise an RES and an ESS. The system may also comprise a second renewable energy source. The RES, ESS, and second renewable energy power plant may combine to provide energy to a node of a power grid. The REPP may utilize an RES-ESS system as described herein that can operate in a normal mode, a capacity boost period of the normal mode, and a peaker mode. As illustrated in FIG. 9A, the RES comprises a solar resource, and the ESS comprises a battery energy storage system ("BESS"). The RES-ESS system comprises a solar inverter and an ESS inverter. The solar inverter and ESS inverter may be an inverter as described herein. The RES-ESS system also comprises a solar transformer to provide voltage conversion utility. The transformer may be a transformer as described herein. The RES-ESS system is connected to the grid through the point of interconnection ("POI"). The second renewable energy power plant comprises a wind resource. The second renewable energy power plant comprises a wind energy management system that tracks the amount of power delivered to the node from the wind resource. The second renewable energy power plant also comprises a wind transformer to provide voltage conversion utility. The transformer may be a transformer as described herein. The system also comprises a control system for controlling the REPP and determining a power output capability of the wind resource, the solar resource, and the ESS. For example, the control system can forecast a power output capability of the wind resource at a point in time in the future. The control system can then use this information to determine the power output requirements for the RES and ESS.

As illustrated in FIG. 9B, the RES comprises a wind resource, and the ESS comprises a BESS. The RES comprises a wind energy management system that tracks the amount of power delivered to the node from the wind resource. The RES-ESS comprises an ESS inverter. The inverter may be an inverter as described herein. The RES-ESS also comprises a wind transformer to provide voltage conversion utility. The transformer may be a transformer as described herein. The RES-ESS system is connected to the grid through the point of interconnection ("POI"). The second renewable energy power plant comprises a solar resource. The second renewable energy power plant comprises a solar inverter. The inverter may be as described herein. The second renewable energy power plant comprises a power sensor. The power sensor can be used to determine the amount of power delivered to the node by the solar resource. The second renewable energy power plant also comprises a solar transformer to provide voltage conversion utility. The transformer may be a transformer as described herein. The system also comprises a control system for controlling the REPP and determining a power output capability of the wind resource, the solar resource, and the ESS. For example, the control system can forecast a power output capability of the solar resource at a point in time in the future. The control system can then use this information to determine the power output requirements for the RES and ESS.

Figure 10:
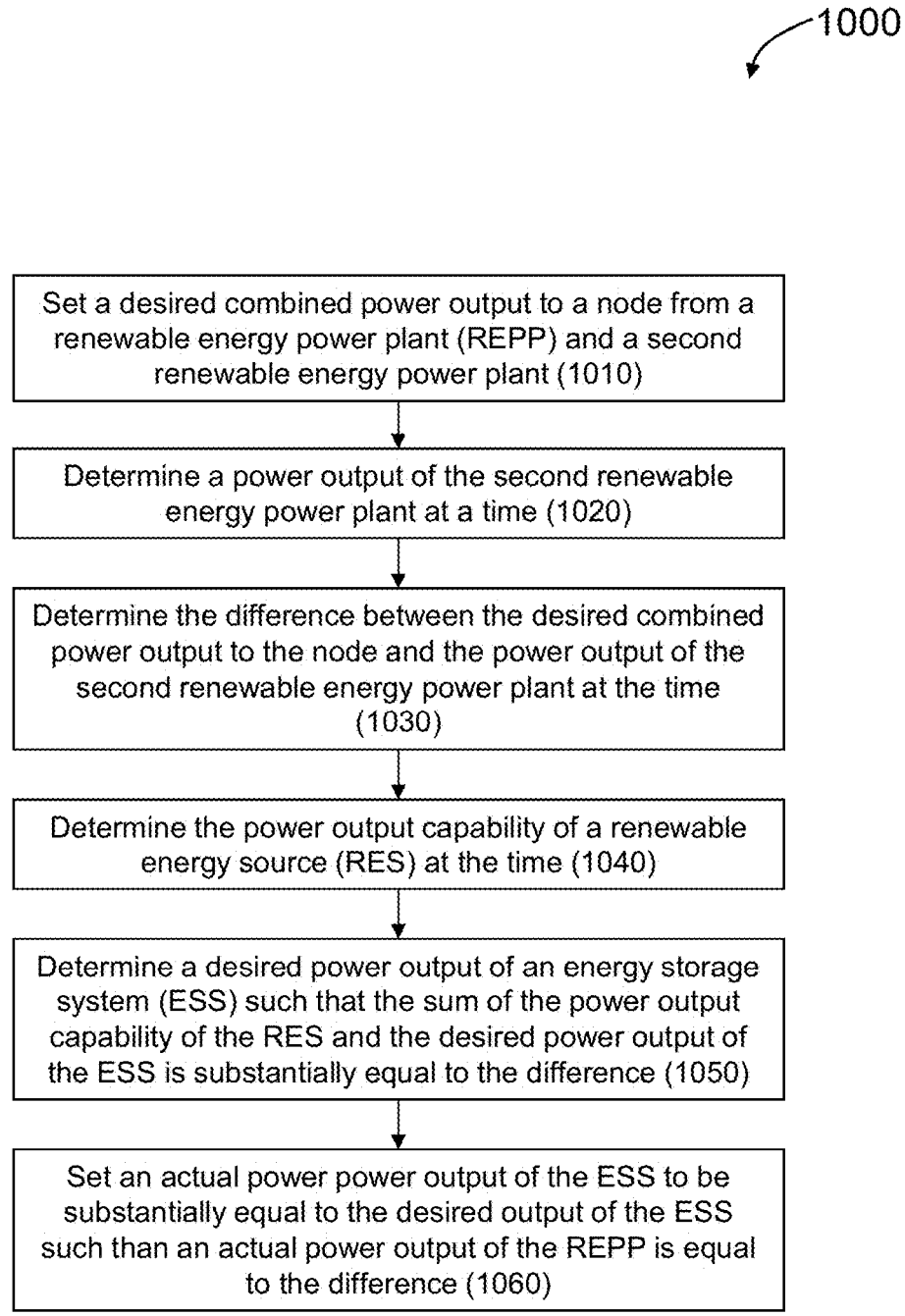
FIG. 10 is a flow chart of a process for controlling the combined power delivered to a node of a power grid, according to some embodiments of the present disclosure.

FIG. 10 is a flow chart of a process 1000 for controlling the combined power delivered to a node of a power grid by an REPP, according to some embodiments of the present disclosure. The process may be performed by a system of one or more computers in one or more locations. For example, the process may be performed by a control system of the REPP system. The REPP may comprise an RES and an ESS. The system may also comprise a second renewable energy source. The RES, ESS, and second or more renewable energy power plants may combine to provide energy to a node of a power grid. The REPP system may also comprise additional renewable energy power plants beyond just a second renewable energy power plant. The system may perform process 1000 for each of a plurality of times.

The system can set a desired combined power output to the node of the power grid. The desired power output may at most be a maximum combined power output of the RES, the ESS, and the second or more renewable energy power plants (1010). The desired combined power output may be considered a firm power output desired by an operator of the REPP or a firm power output needed at the power grid. The desired combined power output may fluctuate throughout any given time of any given day. The desired combined power output may not exceed a sum of the maximum combined power output of the RES and ESS. Because the REPP comprises renewable energy power plants, and because the electrical power generation by renewable energy power plants may vary, the system may implement certain procedures to ensure the REPP maintains the desired combined power output.

The system can determine a power output of the second or more renewable energy power plants at a specified time (1020). The time may be a time in the future, or the time may be an instantaneous measurement of the power output of the second renewable energy power plant. In the case where the second renewable energy power plant comprises a wind resource, the power output can be determined from a wind energy management system. The wind energy management system may comprise a plurality of sensors used to forecast the power output of the wind resource. The sensors may measure the current speed of the wind and also may be used to determine a future speed of the wind at a future point in time. The sensors may also gather temperature data, weather data, or any other data that may affect the power output of the wind resource. If the second or more renewable energy power plants is a solar resource, the power output can be determined from a power sensor used to measure the amount of power generated by the solar resource. The power output can also be determined by using a plurality of sensors used to forecast the power output of the solar resource. The sensors can gather forecasted weather data, forecasted temperature data, forecasted cloud coverage data, forecasted wind data, or the like, used to determine a power output of the solar resource at a point in time in the future.

The forecasted power output of the second renewable energy power plant can also be provided by an operator of the second or more renewable energy power plants. The forecasted power output of the second or more renewable energy power plants can also be determined independently of an operator of the second or more renewable energy power plants. For example, the power output can be determined using the sensors as described herein. As described below, the sensors may be adjacent to, or remote from, the second renewable energy power plant.

The system can determine a difference between the desired combined power output to the node and the power output of the second or more renewable energy power plants at the time (1030). Determining the difference between the desired combined power output and the power output of the second renewable energy power plant may allow the system to determine the amount of power the RES and ESS should generate to meet the desired combined power output at the specified time.

The system can determine a power output capability of the RES at the time (1040). The determination of the power output capability of the RES at the time may be an instantaneous measurement of the power output of the RES. The determination of the power output capability of the RES at the time may be a prediction based on forecasted weather data, forecasted temperature data, forecasted cloud coverage data, forecasted wind data, or the like. The RES can comprise one or more sensors configured to gather the forecasted weather data, forecasted temperature data, forecasted cloud coverage data, forecasted wind data, or the like. The sensors may be adjacent to, or remote from, the RES.

Once the power output capability of the RES at the time is determined, the system can determine a desired power output of the ESS such that a sum of the power output capability of the RES and the desired power output of the ESS is substantially equal to the difference (1050).

The system can then set an actual power output of the ESS to be substantially equal to the desired power output of the ESS such that an actual power output of the REPP is equal to the difference (1060).

There may be a scenario in which the power output capability of the RES at the time is, or is determined to be, greater than the difference. If the system determines that the power output capability of the RES at the time is greater than the difference, then the system can determine an excess RES power. The excess RES power may be the power output capability of the RES minus the difference. If the RES is determined to have excess RES power, this excess power can be used to charge the ESS. The ESS may be charged at a power equal to the lesser of (1) the excess RES power, or (2) a maximum power at which the ESS can be charged. The system may limit the actual power output of the RES to be equal to the difference plus the lesser of (1) the maximum power at which the ESS can be charged, or (2) the excess RES power. If the ESS is fully charged, then the system may limit the actual power output of the RES equal to the difference.

There may be a scenario when the power output capability of the RES at the time is, or is determined to be, less than the difference. If the system determines that the power output capability of the RES at the time is less than the difference, step (1060) may comprise discharging power from the ESS. The discharged power from the ESS can make up for the lack of power output capability of the RES at the time and ensure that the REPP is able to provide firm power substantially equal to the combined power output.

There may be a scenario in which the combined power output is set as a negative number. In such a scenario, the ESS may absorb power from the RES, the second renewable energy power plant, and/or the power grid up to a maximum absorption, or charging, capacity of the ESS, which may fall to zero when the ESS reaches its maximum allowed state of charge. The system can take into consideration the charging power limits and current charge state of the ESS when setting the combined power output.

The difference between the desired combined power output to the node and the power output of the second renewable energy power plant can be continuously varying, as the power output capability of the second renewable energy power plant and the RES can continuously vary. The system can continually adjust the RES and ESS power output to accommodate for the variations in power output of the renewable energy sources to reach the desired combined power output to the node of the power grid.

The ESS of the RES-ESS system may be configured to store energy from the RES, the second renewable energy power plant, and the power grid. The ESS may also be configured to store energy from the RES but not from the power grid. The ESS may also be configured to store no more than 25% of its stored energy from the power grid. The ESS may also be configured to store no more than 20%, 15%, 10%, or 5% of its stored energy from the power grid.

IV. EXAMPLES

Example 1: RES-ESS System for Use as Emergency Backup Peaker

In one example, the RES-ESS system of FIG. 1 may be used as an emergency backup peaker. In this example, the RES may be a solar (PV) power plant and the ESS may be a battery storage system (BESS). The RES-ESS ordinarily operates in normal mode with power output limited to the maximum normal power limit, delivering power to the grid throughout the solar day, while charging the BESS, and then discharging the BESS in the early evening hours to continue delivering power to the grid beyond the time when the RES could not do so alone. However, in an emergency (caused, for example, by an outage in a plant elsewhere in the system, especially one on the same transmission line as the RES-ESS), the plant can be switched to peaker mode, enabling it to deliver power to the grid at a higher, maximum peaker power level by using the power produced by the RES, as well as the energy stored in the BESS. The peaker mode supports the grid to give the system operator time to arrange for either the return to service of the failed plant, or to start up a slower-starting standby plant, or to arrange for load shedding in an organized manner.

Upon return to normal mode operations, the RES-ESS may have a lower state of charge of the ESS than it would normally have under similar circumstances, which may limit its ability to deliver energy to the grid in the early evening following its operation in peaker mode.

Example 2: Varying Transmission Capacity

In another example, the system of FIG. 1 can be used to deliver power to the grid under varying transmission capacities. The output power of the system is limited to be not more than the maximum normal power limit, which is set to be equal to the transmission capacity guaranteed available by the grid operator.

However, from time to time, the grid operator may make additional transmission capacity available (not only due to emergencies, but for a variety of operational reasons, which may be predictable) by increasing the available transmission capacity to not more than a second capacity limit (the "Higher Limit"). During these times the power plant may be switched to its peaker mode, where the maximum peaker power limit is set to be not more than the Higher Limit, if doing so is advantageous after taking into consideration the potential for discharging the ESS earlier than otherwise expected, and thus limiting the ability of the RES-ESS to discharge the ESS in normal mode during the period immediately after operation in peaker mode.

Example 3: Super Peaker

In another example, the system of FIG. 1 may operate in a "super peaker' mode. In this example, the RES is a solar PV array and the ESS is a BESS. The RES-BESS system is used primarily in peaker mode, as illustrated in FIG. 8A, delivering a high level of power to the grid during the early evening period. The PV system charges the BESS during the course of the day, but it also delivers some power to the grid at the same time. During this BESS-charging period, the system operates in normal mode. During the evening peak period, the system switches to peaker mode. During peaker mode operations, the system requires a larger amount of transmission capacity, equal to at least the maximum peaker power limit; but during normal operations the system can be operated within a lower transmission capacity limit, equal to at least the maximum normal power limit. This enables the grid operator to release transmission capacity to other generators (e.g., other solar generators) during the day, while providing the full capacity to the RES-BESS power plant during the peak evening hours. The grid operator can be assured that during the day, while the plant is operating in normal mode, it cannot send more power to the grid than the maximum normal power limit.

Example 4: REPP Implementing a Peaker RES-ESS System

In this example, an REPP system comprises a solar RES, a BESS, and a wind farm as a second renewable energy power plant. The ability for the RES-BESS to operate in the normal mode, the capacity boost period of the normal mode, and the peaker mode is paired with an REPP's ability to provide firm power to a node of a power grid. The REPP was implemented by an electric power utility, using a wind resource. The RES-BESS system is sized at 600 MW, with the BESS being sized at 300 MW. The data shown in FIGS. 12A and 12B show this system is sufficient to provide the electric power utility its energy requirements at all times throughout a day.

Figure 12A:
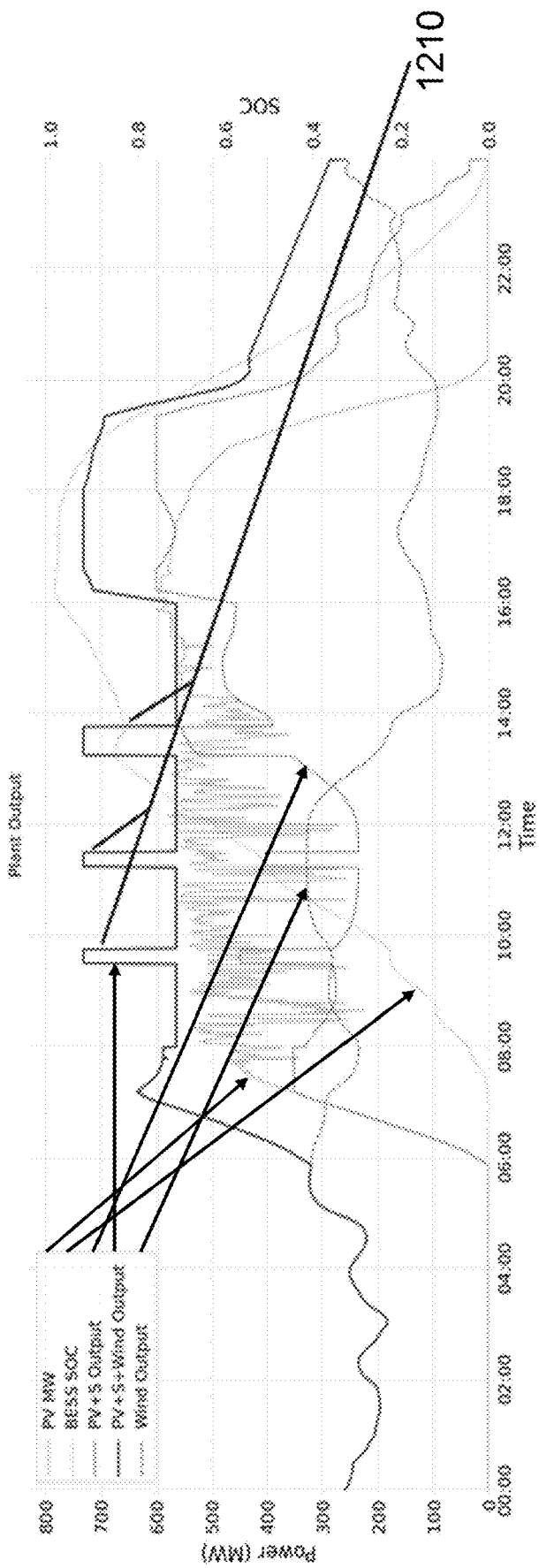
FIG. 12A is a graph illustrating the power output capability of an example REPP comprising an RES-ESS system, according to some embodiments of the present disclosure.

As illustrated in FIG. 12A at 1210, the RES-ESS system is able to quickly transition from a normal mode to a peaker mode at a given time to serve intermittent power generation shortage or market price spikes. The storage capacity of the BESS allows the system to store enough power from the RES and the second renewable energy power plant to provide increased energy during these times of intermittent power generation shortage, as well as provide the increased power need of the early evening hours. Specifically, the BESS allows, on average, the use of 155 MW of under-utilized wind power.

Figure 12B:
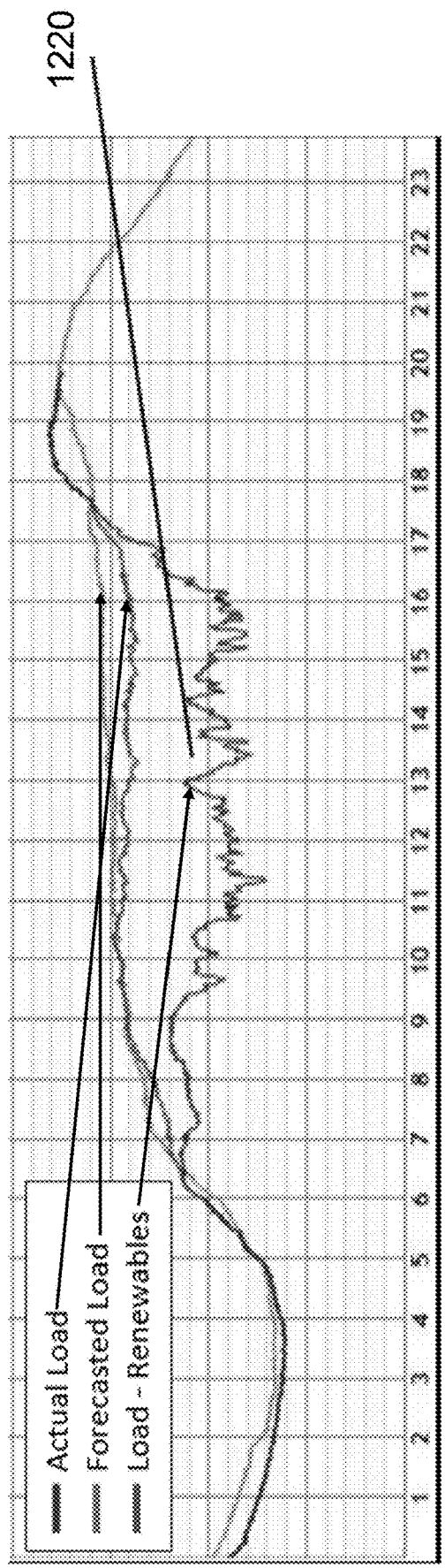
FIG. 12B is a graph illustrating the difference between the power output of an actual load and a renewable load, according to some embodiments of the present disclosure.

As illustrated in FIG. 12B at 1220, there is a difference between the actual load and the load the renewable energy power plants are able to provide. The BESS in this example, sized at 300 MW, is sufficient to be called on at any time to discharge and make up for the difference and ensure that the power provided by the system meets the desired load at all times.

Example 5: REPP for Providing Firmed Power

In this example, an REPP system comprises a solar RES, a BESS, and a wind farm as a second renewable energy power plant. The REPP was implemented by an electric power utility, using a wind resource. The RES-BESS system is sized at 600 MW, with the BESS being sized at 300 MW. The REPP system was used to help firm 731 MW of power.

Figure 13A:
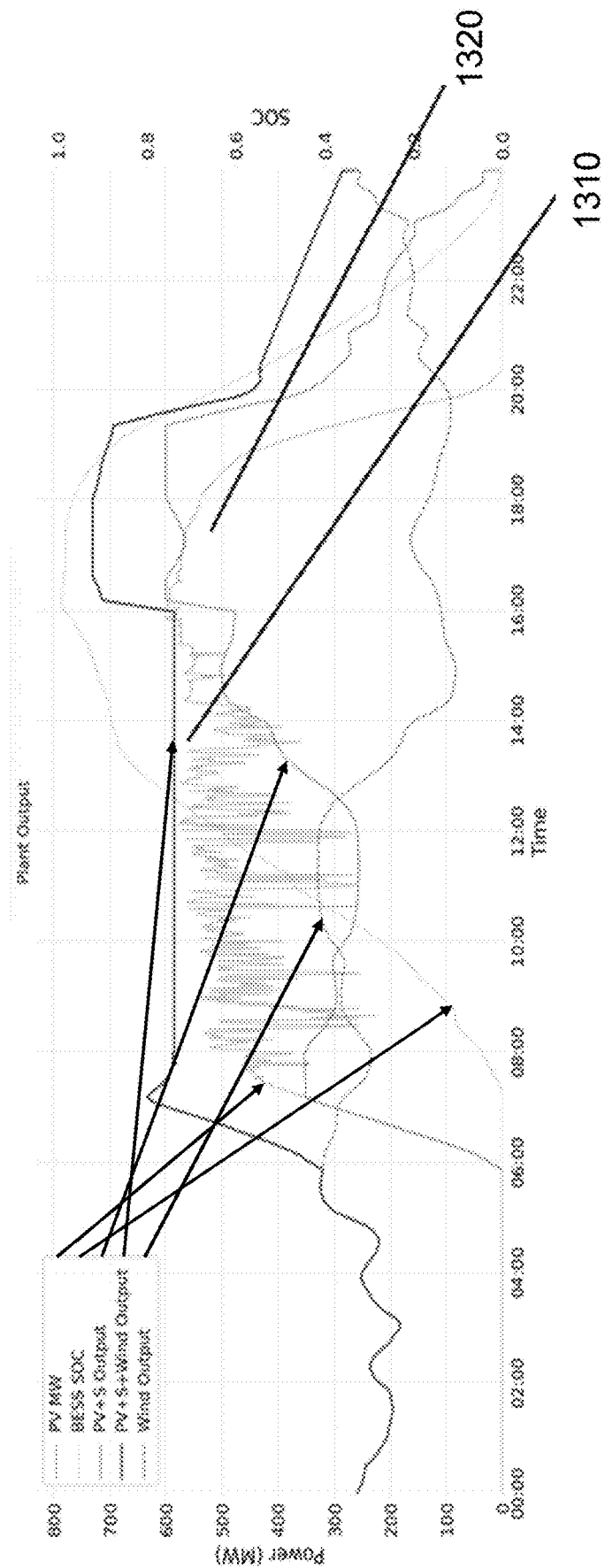
FIG. 13A is a graph illustrating the firming capability of an example REPP comprising an RES-ESS system, according to some embodiments of the present disclosure.

As illustrated in FIG. 13A at 1310, the REPP system utilizes the solar RES, the BESS, and the wind power to provide a firmed power throughout the day. At 1320, the solar RES, the BESS, and the wind power are utilized to provide an increased power demand during the early evening hours of the day. Using current energy production systems, in California's peak load evenings during August and September, an average of 190 MW of wind generation in under-utilized that could be stored by an ESS to help provide the increased energy demand. The BESS in this example is sized to store that currently under-utilized power for use in times of high demand. Specifically, in this example, the REPP system increased the average output by the electric power utility during peak load from 400 MW to 590 MW.

Figure 13B:
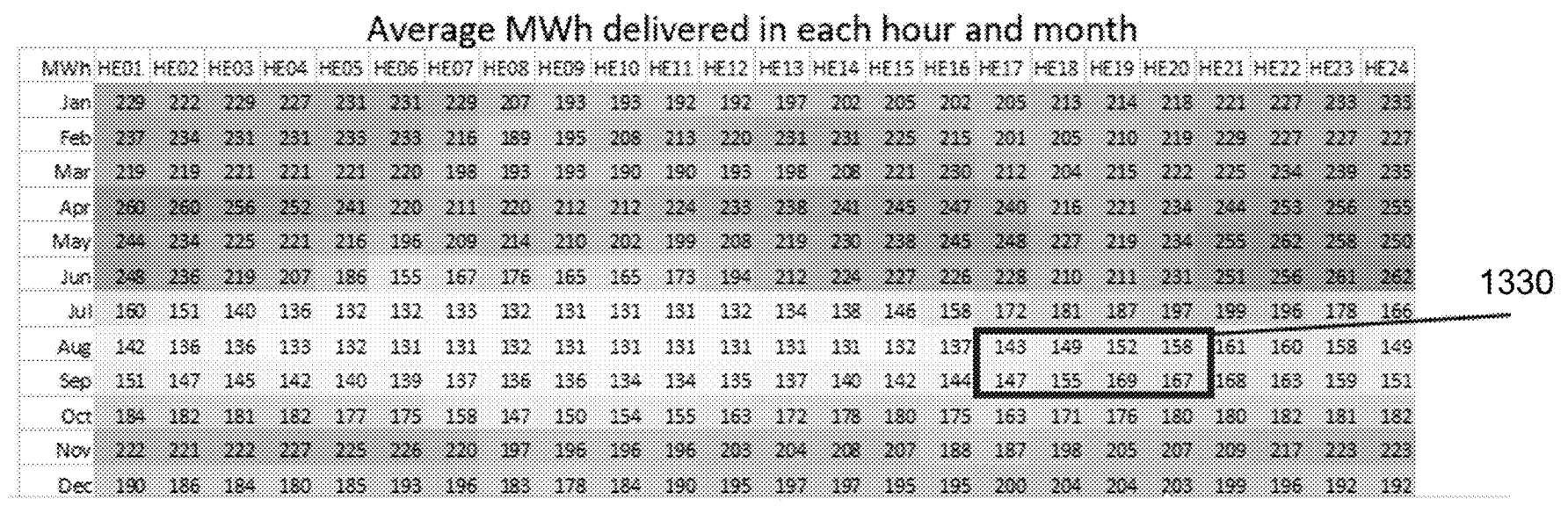

FIG. 13B illustrates the wind power during each hour of each month in a year. As shown at 1330, the wind power generation is at its lowest in August and September during the early evening hours, which is when California experiences its peak load demands. The REPP in this example helped to utilize and store as much of the wind energy as possible to help maintain a firmed power during these peak California power demands.

V. COMPUTER SYSTEMS

Figure 11:
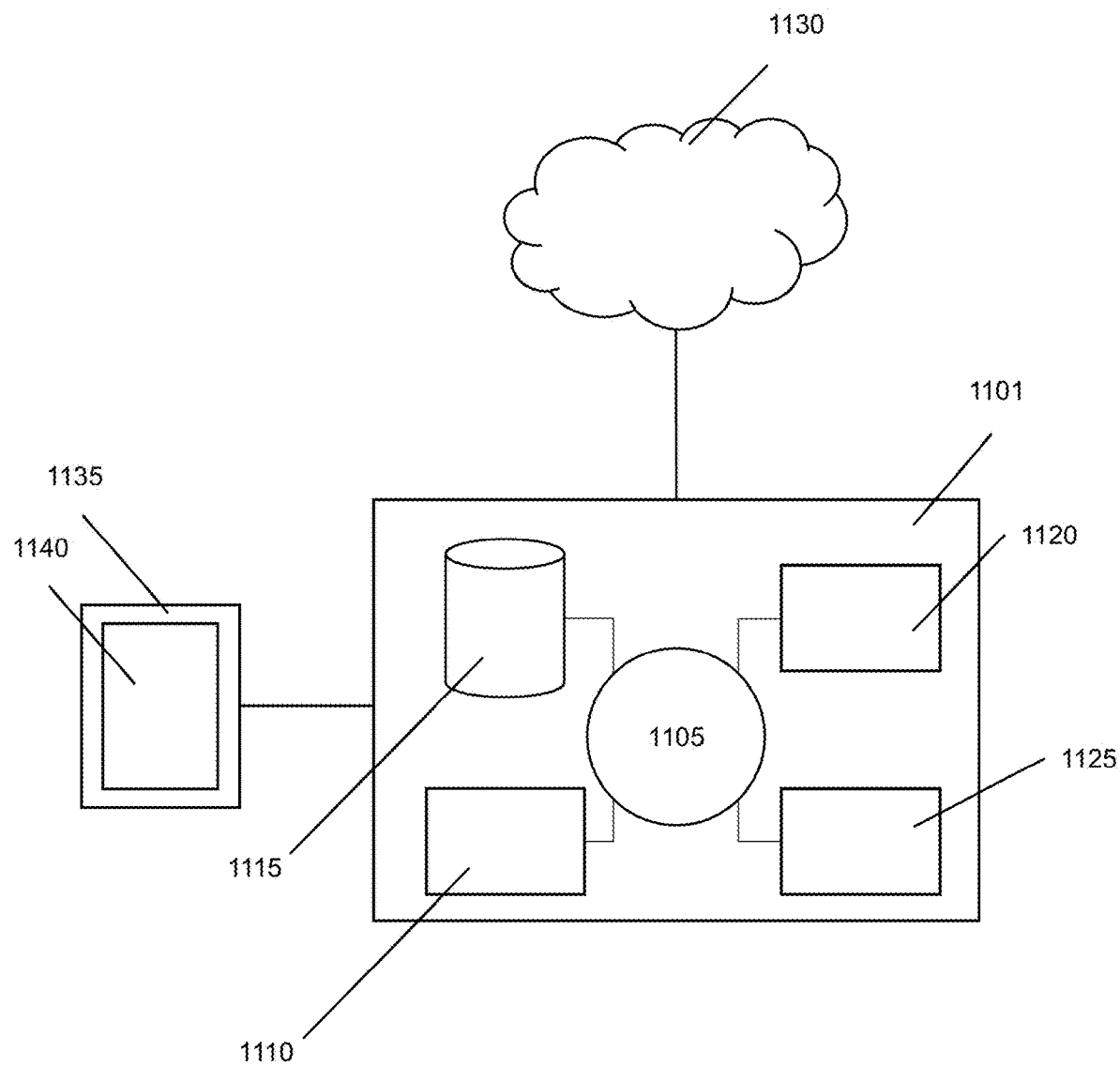
FIG. 11 shows a computer system that is programmed or otherwise configured to implement methods provided herein.

The present disclosure provides computer systems that are programmed to implement methods of the disclosure. FIG. 11 shows a computer system 1101 that is programmed or otherwise configured to control the RES-ESS and REPP systems described herein. For example, the computer system 1101 may be programmed or otherwise configured to perform the process of FIG. 10. The computer system 1101 can be an electronic device of a user or a computer system that is remotely located with respect to the electronic device. The electronic device can be a mobile electronic device.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user (e.g., a database, an enterprise or extraprise system, an Internet-of-Things (IoT) device, a sensor, or the like). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1101 via the network 1130.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140 for providing, for example, a graphical representation of an RES-ESS or REPP system as described herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1105. The algorithm can, for example, measure or forecast a power output capability of an RES or renewable energy power plant. The algorithm can also, for example, determine a power output requirement of an RES, an ESS, or other renewable energy power plant in order to provide firm power to a node of a power grid. The algorithm can also, for example, determine a power output requirement for an RES and ESS in an RES-ESS system operating in a normal mode, a capacity boost period of the normal mode, or peaker mode.

VI. CLAUSES

The disclosure of this application also includes the following numbered clauses:

1. A system for generating power for a power grid, comprising:
   (a) a renewable energy system ("RES") configured to generate electrical power from a renewable energy source;
   (b) a plurality of RES inverters having a first aggregate power capacity;
   (c) an energy storage system ("ESS") configured to store energy from said RES or said power grid;
   (d) a plurality of ESS inverters having a second aggregate power capacity; and
   (e) a controller communicatively coupled to said plurality of RES inverters and said plurality of ESS inverters, wherein said controller is programmed to:
      (i) during a normal mode, limit a combined power output of said plurality of RES inverters and said plurality of ESS inverters to a maximum normal power limit,
      (ii) during a capacity boost period of said normal mode, cause said ESS to discharge through said plurality of ESS inverters to supplement said electrical power generated by said RES, and
      (iii) during a peaker mode, limit said combined power output of said plurality of RES inverters and said plurality of ESS inverters to a maximum peaker power limit, wherein said maximum peaker power limit is greater than said maximum normal power limit,
   wherein said first aggregate power capacity, said second aggregate power capacity, or a sum of said first aggregate power capacity and said second aggregate power capacity is greater than or equal to said maximum peaker power limit
2. The system of clause 1, wherein said renewable energy source is light or wind.
3. The system of any one of clauses 1 to 2, wherein said first aggregate power capacity is greater than or equal to said maximum normal power limit
4. The system of any one of clauses 1 to 3, wherein said second aggregate power capacity is greater than or equal to said maximum normal power limit
5. The system of any one of clauses 1 to 4, wherein during said capacity boost period of said normal mode, said controller is programmed to cause said ESS to discharge through said plurality of ESS inverters such that a total power delivered by said ESS and said RES reaches a fixed level.
6. The system of any one of clauses 1 to 5, wherein said RES comprises one or more transformers, one or more cables, and one or more switchgears.
7. The system of clause 6, wherein said one or more transformers, said one or more cables, and said one or more switchgears of said RES are sized to deliver power to said power grid at a level equal to the lesser of (1) said maximum peaker power limit, or (2) said first aggregate power capacity.
8. The system of any one of clauses 6 to 7, wherein said one or more transformers, one or more cables, and one or more switchgears have a maximum continuous power rating and an absolute maximum power rating, and wherein said controller is further programmed to: during an emergency peaker mode, increase a power through said one or more transformers, one or more cables, and one or more switchgears to a level that is above said maximum continuous power rating and below said absolute maximum power rating for a maximum duration of time.
9. The system of any one of clauses 1 to 8, wherein said ESS further comprises one or more transformers, one or more cables, and one or more switchgears.
10. The system of clause 9, wherein said one or more transformers, one or more cables, and one or more switchgears of said ESS are sized to deliver power to said power grid at a level equal to said maximum peaker power limit during said peaker mode.
11. The system of any one of clauses 1 to 10, wherein said first aggregate power capacity is 10% lower than said maximum peaker power limit
12. The system of any one of clauses 1 to 11, wherein said maximum normal power limit is not less than 20% of said maximum peaker power limit
13. The system of any one of clauses 1 to 12, wherein said maximum peaker power limit is at least 20% greater than said maximum normal power limit
14. The system of any one of clauses 1 to 13, wherein said ESS is configured to store energy from said RES but not from said power grid.
15. The system of any one of clauses 1 to 13, wherein said ESS is configured to derive no more than 25% of its stored energy from said power grid.
16. The system of any one of clauses 1 to 15, wherein said RES comprises a solar plant and wherein said ESS comprises a battery energy storage system (BESS).
17. The system of any one of clauses 1 to 16, wherein said RES and said ESS are configured to operate in said peaker mode during an emergency power outage.
18. The system of any one of clauses 1 to 17, wherein said RES operates in said normal mode during a time of lower power demand, and wherein said RES and said ESS operate in said peaker mode during a time of higher power demand.
19. A method for controlling the combined power delivered to a node of a power grid by (1) a first renewable energy power plant ("REPP") comprising a renewable energy source ("RES"), and an energy storage system ("ESS") and (2) a second renewable energy power plant (REPP), wherein said first REPP and said second REPP have different points of interconnection to said power grid, said method comprising, for each of a plurality of times:
   (a) setting a desired combined power output to said node, wherein said desired power output is at most a maximum combined power output of said RES, said ESS, and said second REPP;
   (b) determining a power output of said second REPP at said time;
   (c) determining a difference between said desired combined power output to said node and said power output of said second REPP at said time;
   (d) determining a power output capability of said RES at said time;
   (e) determining a desired power output of said ESS such that a sum of said power output capability of said RES and said desired power output of said ESS is substantially equal to said difference; and (f) setting an actual power output of said ESS to be substantially equal to said desired power output of said ESS such that an actual power output of said first REPP is equal to said difference.

20. The method of clause 19, wherein said power output capability of said RES at said time is greater than said difference, and wherein said method further comprises determining an excess RES power comprising said power output capability of said RES minus said difference.

21. The method of clause 20, wherein (f) comprises charging said ESS at a power equal to the lesser of (1) said excess RES power, or (2) a maximum power at which said ESS can be charged.

22. The method of clause 21, further comprising limiting an actual power output of said RES to said difference plus the lesser of (1) said maximum power at which said ESS can be charged, or (2) said excess RES power.

23. The method of clause 21, further comprising limiting said actual power output of said RES to said difference when said ESS is charged to a maximum storage capacity.

24. The method of any one of clauses 19 to 23, wherein said power output capability of said RES at said time is less than said difference, and wherein (f) comprises discharging said ESS.

25. The method of any one of clauses 19 to 24, wherein said time is a future time, and wherein determining said power output of said second REPP comprises predicting said power output of said second REPP at said time.

26. The method of clause 25, wherein predicting said power output comprises using one or more of forecasted weather data, forecasted temperature data, forecasted cloud coverage data, or forecasted wind data.

27. The method of any one of clauses 25 to 26, wherein said second REPP comprises one or more sensors configured to gather said forecasted weather data, forecasted temperature data, forecasted cloud coverage data, or forecasted wind data.

28. The method of clause 27, wherein said sensors are adjacent to said second REPP.

29. The method of clause 27, wherein said sensors are remote from said second REPP.

30. The method of any one of clauses 19 to 29, wherein said ESS is configured to be charged exclusively from said RES.

31. The method of any one of clauses 19 to 29, wherein said ESS is configured to derive no more than 25% of its stored energy from said power grid.

32. The method of any one of clauses 19 to 31, wherein said RES comprises a solar array and said second REPP comprises a wind farm.

33. The method of any one of clauses 19 to 32, wherein said desired combined power output is at most a maximum combined power output of said RES said ESS.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for controlling a combined power delivered to a node of a power grid, the method comprising:
    for a plurality of time points, setting a desired firmed combined power output of a renewable energy power plant ("REPP") and a power source to a node of a power grid, wherein the desired firmed combined power output is at most a maximum combined power output of the REPP and the power source, wherein the REPP includes a renewable energy source ("RES") and an energy storage system ("ESS");
    identifying a forecast power output capability of the RES for the plurality of time points and a forecast power output of the power source for the plurality of time points;
    prior to the plurality of time points, determining a separate desired power output of the ESS for each of the plurality of time points such that a sum of the forecast power output capability of the RES and the desired power output of the ESS is substantially equal to a difference between the desired firmed combined power output to the node and the forecast power output of the power source for each of the plurality of time points; and
    prior to the plurality of time points, setting an actual power output of the ESS for the plurality of time points to be substantially equal to the desired power output of the ESS such that an actual power output of the REPP is equal to the difference for each of the plurality of time points.

2. The method of claim 1, wherein the forecast power output capability of the RES for the plurality of time points is greater than the difference, and wherein the method further comprises determining an excess RES power comprising the power output capability of the RES minus the difference.

3. The method of claim 2, further comprising charging the ESS at a power equal to the lesser of (1) the excess RES power, or (2) a maximum power at which the ESS can be charged.

4. The method of claim 3, further comprising limiting an actual power output of the RES to the difference plus the lesser of (1) the maximum power at which the ESS can be charged, or (2) the excess RES power.

5. The method of claim 3, further comprising limiting the actual power output of the RES to the difference when the ESS is charged to a maximum storage capacity.

6. The method of claim 1, wherein the forecast power output capability of the RES for the plurality of time points is less than the difference, and further comprising discharging the ESS at a power equal to the lesser of the difference and a maximum power at which the ESS can be discharged.

7. The method of claim 1, wherein the forecast power output of the RES and is based on one or more of forecast weather data, forecast temperature data, forecast cloud coverage data, or forecast wind data.

8. The method of claim 7, wherein the power source comprises one or more sensors configured to gather the forecast weather data, forecast temperature data, forecasted forecast cloud coverage data, or forecast wind data for the power source, and wherein the REPP comprises one or more other sensors configured to gather the forecast weather data, forecast temperature data, forecasted cloud coverage data, or forecast wind data for the REPP.

9. The method of claim 1, wherein the power source is a second REPP comprising a second RES and a second ESS.

10. The method of claim 1, wherein determining the forecast power output capability of the RES for the plurality of time points comprises determining the forecast power output capability based further on a forecast of a second type of renewable energy at the REPP.

11. The method of claim 1, further comprising:
determining the desired firmed combined power output is a negative number; and
responsive to the determining the desired firmed combined power output is a negative number, configuring the ESS to absorb power from the RES, the power source, or the power grid up to a maximum absorption or charging capacity of the ESS.

12. The method of claim 1, further comprising:
maintaining the desired firmed combined power output by continuously adjusting an ESS power output of the ESS in response to variations in an RES power output of the RES.

13. A system comprising:
a computer processor operatively coupled to computer memory and configured by machine-readable instructions to:
for a plurality of time points, set a desired firmed combined power output of a renewable energy power plant ("REPP") and a power source to a node of a power grid, wherein the desired firmed combined power output is at most a maximum combined power output of the REPP and the power source, wherein the REPP includes a renewable energy source ("RES") and an energy storage system ("ESS");
identify a forecast power output capability of the RES for the plurality of time points and a forecast power output of the power source for the plurality of time points;
prior to the plurality of time points, determine a separate desired power output of the ESS for each of the plurality of time points such that a sum of the forecast power output capability of the RES and the desired power output of the ESS is substantially equal to a difference between the desired firmed combined power output to the node and the forecast power output of the power source for each of the plurality of time points; and
prior to the plurality of time points, set an actual power output of the ESS for the plurality of time points to be substantially equal to the desired power output of the ESS such that an actual power output of the REPP is equal to the difference for each of the plurality of time points.

14. The system of claim 13, wherein the forecast power output capability of the RES for the plurality of time points is greater than the difference, and wherein the computer processor is further configured to determine an excess RES power comprising the power output capability of the RES minus the difference.

15. The system of claim 14, wherein the computer processor is further configured to charge the ESS at a power equal to the lesser of (1) the excess RES power, or (2) a maximum power at which the ESS can be charged.

16. The system of claim 15, wherein the computer processor is further configured to limit an actual power output of the RES to the difference plus the lesser of (1) the maximum power at which the ESS can be charged, or (2) the excess RES power.

17. The system of claim 15, wherein the computer processor is further configured to limit the actual power output of the RES to the difference when the ESS is charged to a maximum storage capacity.

18. The system of claim 13, wherein the forecast power output capability of the RES for the plurality of time points is less than the difference, and wherein the computer process is further configured to discharge the ESS at a power equal to the lesser of the difference and a maximum power at which the ESS can be discharged.

19. Non-transitory computer-readable media comprising instructions thereon that, when executed by one or more processors, cause the one or more processors to:
for a plurality of time points, set a desired firmed combined power output of a renewable energy power plant ("REPP") and a power source to a node of a power grid, wherein the desired firmed combined power output is at most a maximum combined power output of the REPP and the power source, wherein the REPP includes a renewable energy source ("RES") and an energy storage system ("ESS");
identify a forecast power output capability of the RES for the plurality of time points and a forecast power output of the power source for the plurality of time points;
prior to the plurality of time points, determine a separate desired power output of the ESS for each of the plurality of time points such that a sum of the forecast power output capability of the RES and the desired power output of the ESS is substantially equal to a difference between the desired firmed combined power output to the node and the forecast power output of the power source for each of the plurality of time points; and
prior to the plurality of time points, set an actual power output of the ESS for the plurality of time points to be substantially equal to the desired power output of the ESS such that an actual power output of the REPP is equal to the difference for each of the plurality of time points.

20. The non-transitory computer-readable media of claim 19, wherein the forecast power output capability of the RES for the plurality of time points is greater than the difference, and wherein the instructions further cause the one or more processors to determine an excess RES power comprising the power output capability of the RES minus the difference.

* * * * *